(12) United States Patent
Kawakami et al.

(10) Patent No.: US 6,852,203 B1
(45) Date of Patent: Feb. 8, 2005

(54) THREE-DIMENSIONAL PERIODICAL STRUCTURE, ITS MANUFACTURING METHOD, AND METHOD OF MANUFACTURING FILM

(75) Inventors: Shojiro Kawakami, Miyagi-ken (JP); Hiroyuki Sakaki, Kanagawa-ken (JP); Kazuo Shiraishi, Saitama-ken (JP)

(73) Assignee: Autocloning Technology, LTD, Miyagi (JP)

( * ) Notice: Subject to any disclaimer, the term of this patent is extended or adjusted under 35 U.S.C. 154(b) by 0 days.

(21) Appl. No.: 09/402,112
(22) PCT Filed: Mar. 24, 1998
(86) PCT No.: PCT/JP98/01278
§ 371 (c)(1),
(2), (4) Date: Feb. 18, 2000
(87) PCT Pub. No.: WO98/44368
PCT Pub. Date: Oct. 8, 1998

(30) Foreign Application Priority Data

Mar. 29, 1997 (JP) .............................................. 9/114951
Feb. 23, 1998 (JP) ........................................... 10/040736

(51) Int. Cl.[7] .............................. C23C 14/34; B32B 3/12
(52) U.S. Cl. .............................. 204/192.3; 204/192.32; 204/192.37; 204/192.23; 428/118
(58) Field of Search ........................ 204/192.23, 192.15, 204/192.3, 192.32, 192.37; 428/118

(56) References Cited

U.S. PATENT DOCUMENTS 5,600,483 A   2/1997  Fan et al. .................... 359/344

FOREIGN PATENT DOCUMENTS

| EP | 0 486 128 A2 | 5/1991 | ........... H01L/33/00 |
| JP | 58-42003 A | 3/1983 | ............ G02B/5/30 |
| JP | 62-289804 A | 12/1987 | ............ G02B/5/30 |
| JP | 3-3285 A | 1/1991 | ............. H01S/3/18 |

OTHER PUBLICATIONS

Russell, Philip St. J., "Photonic Bank Gaps," Physics World, GB, IOP Publishing, Bristol, vol. 5, No. 8, Aug. 1, 1992, pp. 37–42.

Yablonovitch, E., "Photonic Band–Gap Structures," Journal of the Optical Society of America, vol. 10, No. 2, Feb. 1, 1993, pp. 283–295.

Kawakami, S., "Fabrication of Submicrometre 3D Periodic Structures Composed of Si/SiO/sub 2/", Electronics Letters, Jul. 3, 1997, vol. 33, No. 14, pp. 1260–1261.

Primary Examiner—Steven Versteeg
(74) Attorney, Agent, or Firm—Randall J Knuth

(57) ABSTRACT

A three-dimensional periodical structure whose period is about 1 $\mu$m or smaller is provided. At least two kinds of films which have two-dimensionally substantially periodical projections are successively formed in layers substantially periodical to construct structure which is substantially three-dimensionally periodical. For instance, the films are made of materials different in refractive index. The three-dimensional periodical structure whose period is about 1 $\mu$m or smaller can be obtained by a simple fabricating method. By this structure, the propagation of a wave with a specific wavelength in many solid angular directions including several axial directions parallel to the plane and the thickness direction of the layers can be cut off.

9 Claims, 29 Drawing Sheets

Inside the Rectangular
Corresponds to Fundametal
Period

THREE-DIMENSIONAL PERIODICAL STRUCTURE, ITS MANUFACTURING METHOD, AND METHOD OF MANUFACTURING FILM

TECHNICAL FIELD

The present invention relates to a generic technique concerning a structure having substantially three-dimensionally-periodical refractive index distribution, which is used, for example, as a light wave circuit element, its fabricating method, applied technique, and an applied device.

BACKGROUND ART

A technique for fabricating a three-dimensional periodic structure having a period of about 1 μm or less in a material has a broad range of possible application in the fields of optical technologies and electronic technologies. However, its fabrication method is not developed yet, and a three-dimensional periodic structure with a period of about 1 μm or less has not been realized up to now. Among techniques which have been examined, the following two are main ones: (1) a method in which holes are formed in three directions by dry etching, as shown in FIG. 54, (E. Yablonovitch, "Photonic band-gap structures", J. Opt. Soc. Am. B, vol, 10, no.2. pp. 283–295, 1993); and (2) a method in which substrates with parallel square rods on them are opposed and bonded to each other, one of the substrates is removed by selective etching, and another substrate is opposed and bonded again to repeat the operation, as shown in FIG. 55, (S. Noda, N. Yamamoto, and A. Sasaki, "New realization method for three-dimensional photonic crystal in optical wavelength region", Jpn. J. Appl. Phys., vol. 35, pp. L909–L912, 1996). Up to now, these two ideas are not realized int eh case that the period is about 1 μm or less and the number of periods is five or more.

In the above-mentioned method (1), it is disadvantageous that processing of more than three or four periods is impossible. In the above-mentioned method (2), reproducibility and productivity are low, since it depends on handicraft processes with low controllability such as selective chemical etching and bonding many times.

The present invention is completed to solve the above-described problems of the conventional techniques, and its object is to provide a three-dimensional structure having a period of about 1 μm or less, to provide parts and devices to which that structure is applied, and to provide their fabrication method.

DISCLOSURE OF THE INVENTION

To attain the above-described object, it is necessary to realize a three-dimensionally-periodic structure by a method superior in reliability and reproducibility. For that purpose, to effect such a method, at least two kinds of materials are laminated sequentially and periodically, and sputter etching is carried out separately from or simultaneously with film formation with regard to at least a part of the laminated layers. This method can fabricate a three-dimensional periodic structure having a period of about 1 μm or less.

Functions

When a three-dimensional periodic structure is constructed by the above-described means, it is possible to realize one having a period of about 1 μm or less, simply and with good reproducibility. Further, into the periodic structure, can be introduced a material of nonlinear optical susceptibility, a light emitting or light amplifying material, an electrooptic material, a transparent object, an electrically-conductive material, or the like. Further, into the periodic structure, can be built a waveguide, resonator, branch, coupler, reflector, semiconductor laser, optical detector, or the like. Accordingly, an applied part or device can be fabricated by a method which is superior in reliability and repeatability. The present invention is generic one in that it originates from a common root and comprehends various developments, which will become obvious from the following embodiments.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

(Explanation of the Reference Numerals)

Figure 1:
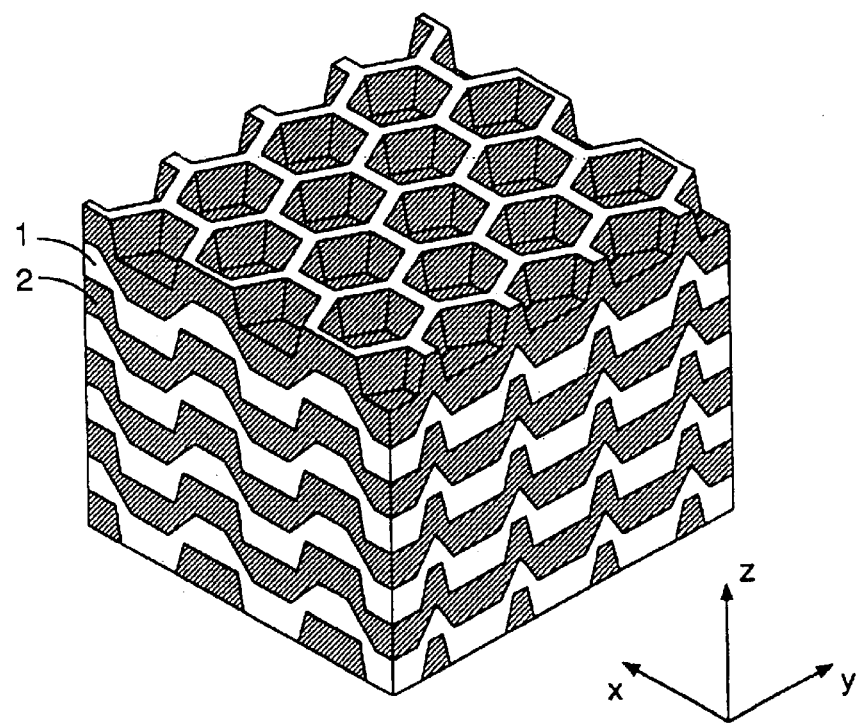
FIG. 1 is an explanatory view showing one embodiment of the invention.

1 material A (for example, $SiO_2$;
2 material B (for example, Si);
3 substrate;
4 vacuum chamber;
5 target;
6 matching circuit;
7 high frequency power source
8 substrate electrode
9 dielectric
10 metal
11 evaporation source
12 laser
13 source material
14 gaseous ion
15 material particle
16 material having refractive index n,
17 material having refractive index $n_2$ ($n_1 > n_2$
18 resist for lithography
19 Si
20 $SiO_2$
21 metal A (for example, Al, or the like)
22 metal B (for example, Pt, Ni, W. Ti, or the like)
23 functional unit
24 three-dimensional photonic bandgap structure
25 $LNbO_3$
26 Er-doped $SiO_2$
27 active region
28 output waveguide
29 substrate of group III–V semiconductor
30 epitaxial layer
31 GaAs
32 AlGaAs

BEST MODE FOR CARRYING OUT THE INVENTION

[Embodiment 1]

First, out of thin film formation methods and etching methods, ones referred to in the present invention and some which can be applied to the present invention will be described in-outline.

Figure 2:
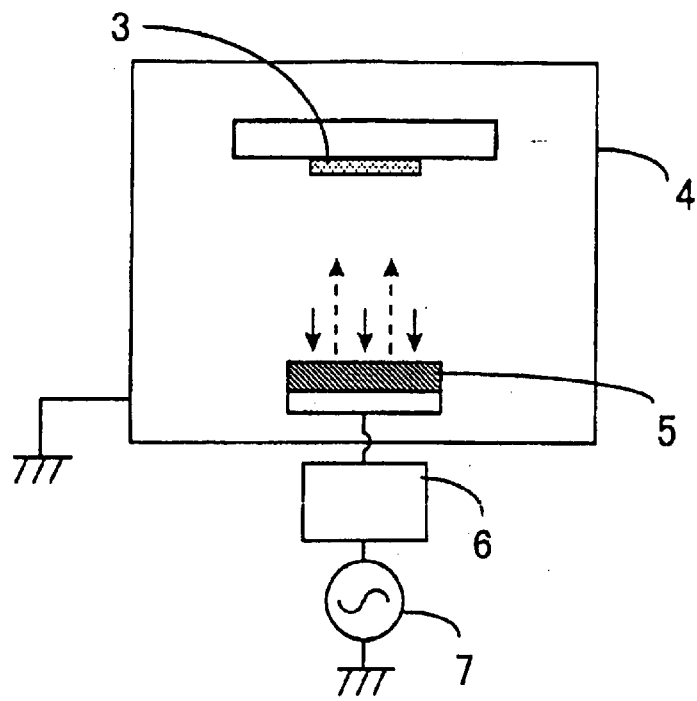
FIG. 2 is an explanatory view showing a sputtering method.

FIG. 2 is a schematic view showing an ordinary high frequency sputtering system. Inside a vacuum chamber 4, are arranged a target 5, which is a supply source of source material for thin film, and a substrate 3 opposed to the target 5. The target 5 is connected to a high frequency power source 7 via an impedance matching circuit 6. Into the inside of the vacuum chamber 4, is introduced gas which includes an inert gas (for example, Ar gas) as its main component and is obtained, for example, by adding hydrogen gas to Ar gas. Then, high frequency power is supplied to the target electrode to generate plasma. Since the target 5 is at negative potential on time average (self-bias effect), positively-charged gaseous ions are incident to the target 5, while having high energy (solid line arrows), to scatter the target material. The scattered material particles arrive at and adhere to the substrate 3 (dashed line arrows) to form a film on the substrate.

Figure 3:
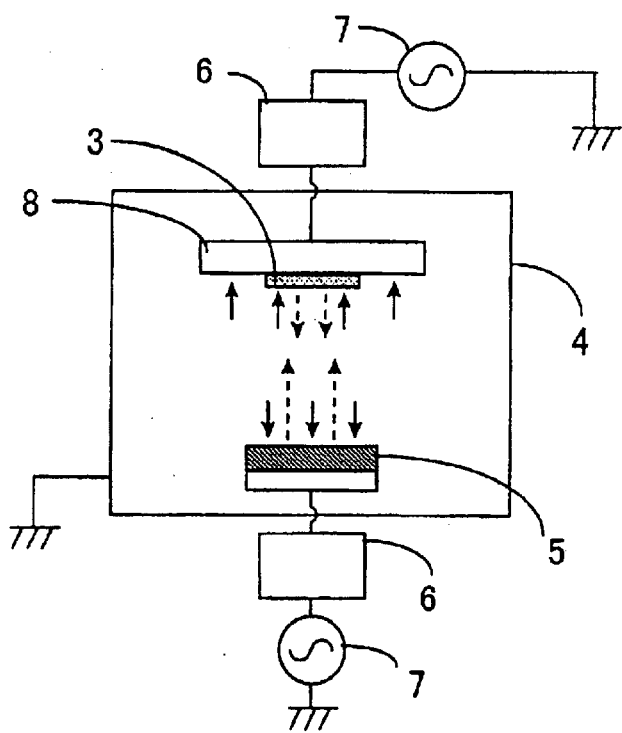
FIG. 3 is an explanatory view showing a bias sputtering method.

FIG. 3 shows an outline of a bias sputtering system. In comparison with the system of FIG. 2, this is added with a substrate electrode 8, which is connected to a high frequency power source 7 through a matching circuit. By supplying high frequency power to the substrate electrode 8, gaseous ions are made to be incident to the surface of the substrate 3 (solid line arrows) similarly to the case of the target 5, and thus, it is possible to scatter particles from the surface of the substrate 3. By varying the high frequency power to be supplied, the kind and pressure of the gas, the shape of the substrate electrode, and the like; it is possible to control quantity and energy of the impacting ions and effect of the sputtering.

Figure 4:
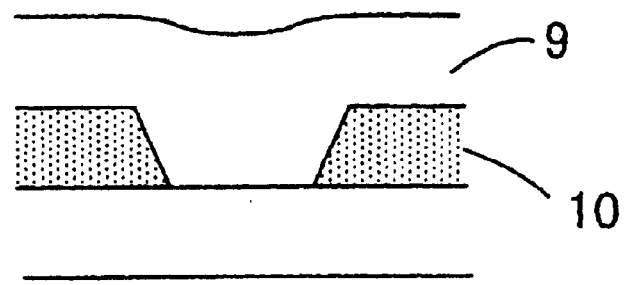
FIG. 4 is an explanatory view showing an application example of the conventional bias sputtering method.
Figure 5:
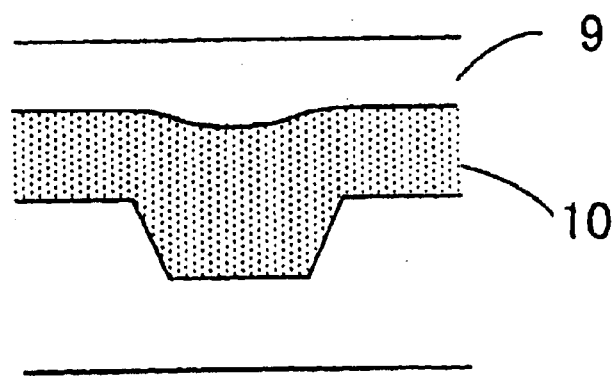
FIG. 5 is an explanatory view showing an application example of the conventional bias sputtering method.

Conventionally, the bias sputtering method has been utilized as a thin film formation process (metallization) for forming electrodes and wiring in LSI. For example, as shown in FIG. 5, it is utilized for embedding metal film wiring 10 in a dielectric 9 to flatten an upper surface, or, as shown in FIG. 4, for filling up a space between two wires 10 not to produce a hollow portion. On the other hand, it is entirely novel technique to employ bias sputtering or sputter etching for shaping the film described below.

Figure 6:
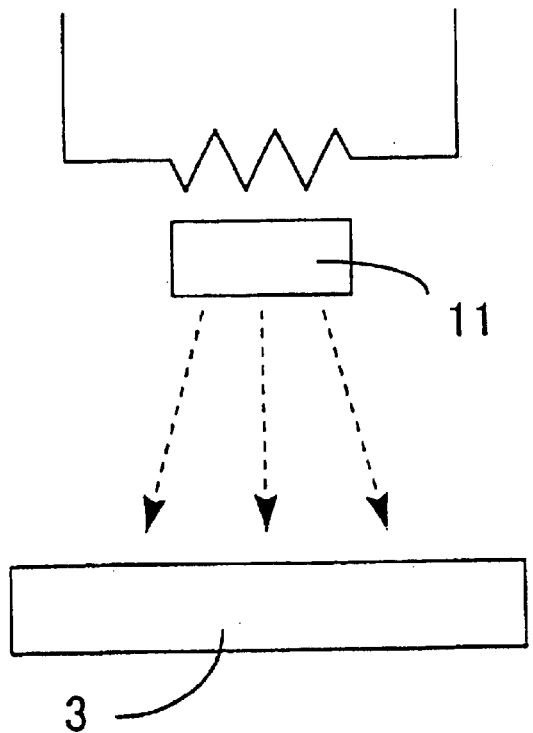
FIG. 6 is an explanatory view showing a vacuum evaporation method.
Figure 7:
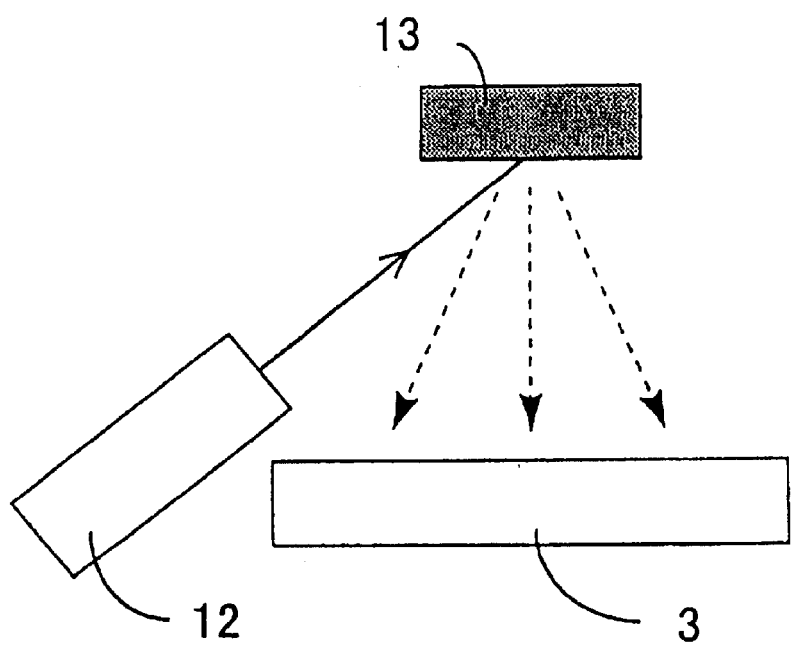
FIG. 7 is an explanatory view showing a laser ablation method.

FIG. 6 illustrates the concept of the vacuum evaporation method. From an evaporation source 11 subjected to resistance heating or electron beam heating, source material transpires into a vacuum, and arrives at and adheres to a substrate 3. FIG. 7 illustrates the concept of the laser ablation. High power pulse laser radiation from a laser 12 is made to be incident to source material 13 so that part of the source material is instantaneously heated and transpires to arrive at and adhere to a substrate 3.

Further, the sputter etching, which plays a role of shaping a film in the present invention, will be described now. Another kind of film formation can proceed simultaneously with the sputter etching. For example, the bias sputtering refers to a simultaneous process in which film formation by the sputtering proceeds at the same time with the sputter etching.

In the system of FIG. 3, by applying the high frequency power only to the substrate electrode 8 without applying it to the target 5, single-operation sputter etching, in which film formation does not proceed, is realized. As described above, this sputter etching has a function of shaping a film, and, when it is performed after a film is formed to have some degree of thickness, it can shape the film into a desired shape.

On the other hand, by applying the high frequency power source 7 to the target 7 while applying the high frequency power source 7 to the substrate electrode 8 too, it is possible to make both the film formation and the sputter etching proceed simultaneously. Namely, it is possible to make the bias sputtering proceed.

Here, a relation between the power or frequency of the high frequency power source 7 applied to the substrate electrode 8 or the power or frequency of the high frequency power source 7 applied to the target 5 and the formed film or the shape of the film shaped by the sputter etching varies according to gas pressure introduced into the vacuum chamber 4 and the material of the film, thus it being difficult to decide the relation generally. However, by obtaining the relation by experiments or the like in each specific condition, a man in the art can easily carry out the above-described techniques.

Figure 8:
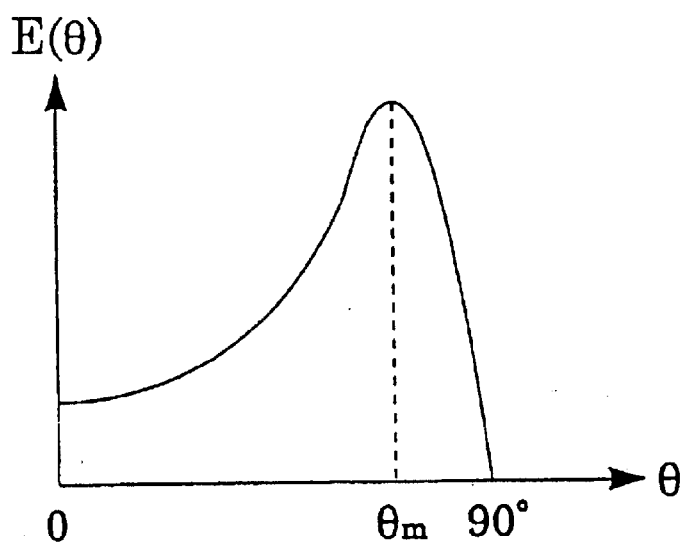
FIG. 8 is an explanatory view showing angular dependence of etching rate.

In the sputter etching, a rate at which a surface being etched moves back in the direction of the normal is defined as a function of inclination $\theta$ of the surface, and called an etching rate. For many materials, an etching rate $E(\theta)$ has a property as shown in FIG. 8. Namely, it becomes the maximum at some angle $\theta_m$ between 0° and 90°, and, making this a turning point, it decreases monotonously toward both the left and right. Also, this sputter etching may be carried out before or after the above-mentioned sputtering film formation, vacuum evaporation, or laser ablation.

An example of forming a three-dimensional periodic structure will be described. Periodic lines of holes are formed on a fused silica substrate by the electron beam lithography and by the dry etching. For example, a diameter of each hole is made to be 0.2 $\mu$m and the holes are arranged in a shape of hexagonal lattice so that an interval between centers of holes becomes 0.5 $\mu$m. Or, a film may be formed on a substrate, and an array of holes may be formed on that film. In that case, the term "substrate" is used including the film. On it, Si and $SiO_2$ are deposited by means of the high frequency sputtering. For a part of the laminated layers of $SiO_2$ out of the laminated layers, etching action of ions ionized by the high frequency and impinging against the surface of the substrate, i.e., sputter etching, and lamination by the high frequency sputtering are made to proceed simultaneously. An example of film formation will be described. For $SiO_2$ film formation, rf power applied to the target is 400 W, Ar flow rate 72 sccm, $H_2$ flow rate 8 sccm, and gas pressure 2.0 mTorr, while bias power (rf power applied to the substrate electrode for the sputter etching) of 60 W is applied throughout the film formation time for each layer. On the other hand, in Si film formation, rf power applied to the target is 400 W, Ar flow rate 76 sccm, $H_2$ flow rate 4 scm, and gas pressure 3.6 mTorr, while the bias power is not applied. In both cases, film thickness is 0.2 $\mu$m. Since the shaping action of the sputter etching is utilized, the two-dimensional periodic shape on the substrate is not lost, even when Si and $SiO_2$ are laminated in many cycles. Using an atomic force microscope, it has been verified that a periodic structure on a surface is stable even when lamination is carried out in several tens of cycles. As shown in FIG. 1 (and in detail in FIG. 9), in the inside, three-dimensional and highly periodic structure is formed.

Figure 10:
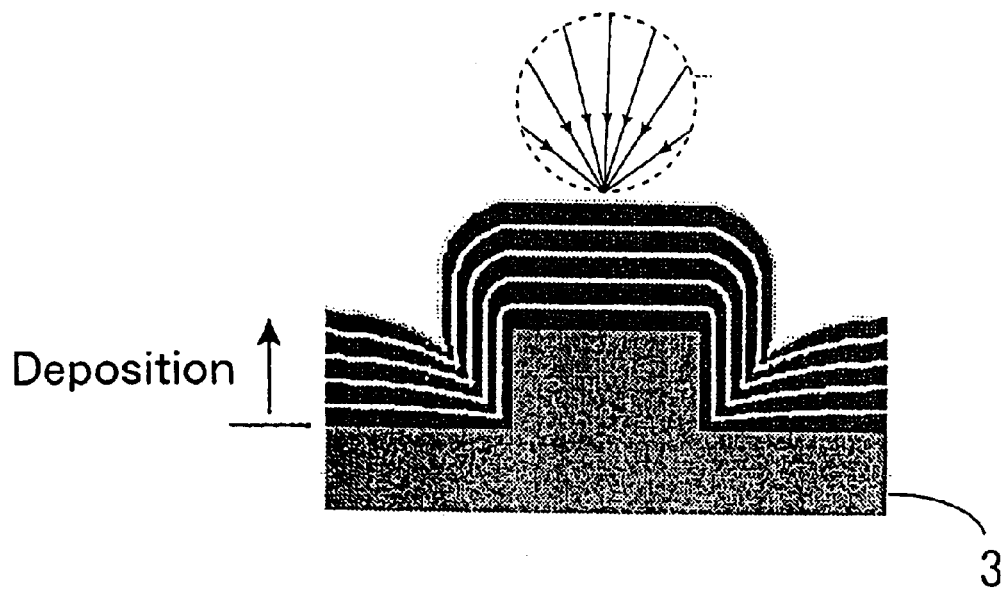
FIG. 10 is an explanatory view showing a fabrication mechanism of the invention.
Figure 11:
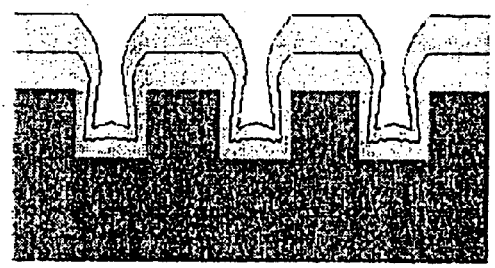
FIG. 11 is an explanatory view showing a fabrication mechanism of the invention.
Figure 12:
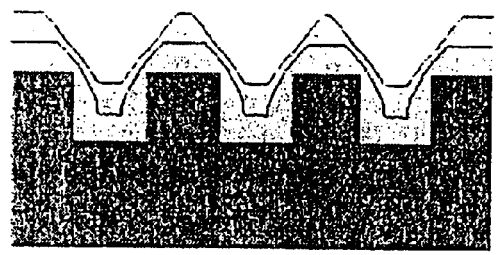
FIG. 12 is an explanatory view showing a fabrication mechanism of the invention.
Figure 13:
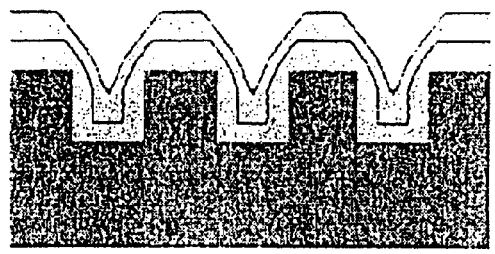
FIG. 13 is an explanatory view showing a fabrication mechanism of the invention.

The mechanism of forming this periodic structure is considered as follows. In sputtering, when particles of film material diffusively are incident to a substrate whose cross section is shown in a solid line in FIG. 10, i.e., when they are incident with a finite range of incident angles, there are produced bends kinks) in bottom portions of deposited films, as shown in FIG. 10 or 11. In the figures, fine lines show film formation processes in time series. When sputter etching is superposed to this effect, a surface of certain inclination develops at a shoulder portion owing to angular selectivity, forming a shape shown in FIG. 12 or a shape shown in FIG. 13.

Figure 14:
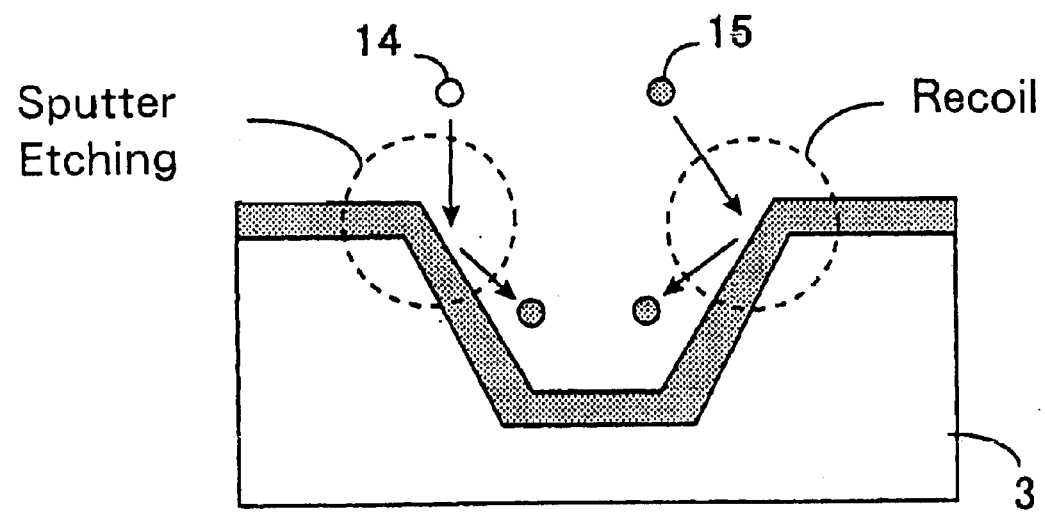
FIG. 14 is an explanatory view showing a fabrication mechanism of the invention.
Figure 15:
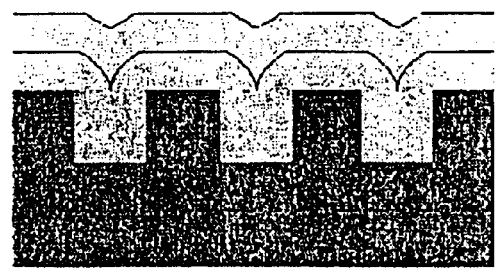
FIG. 15 is an explanatory view showing a fabrication mechanism of the invention.
Figure 16:
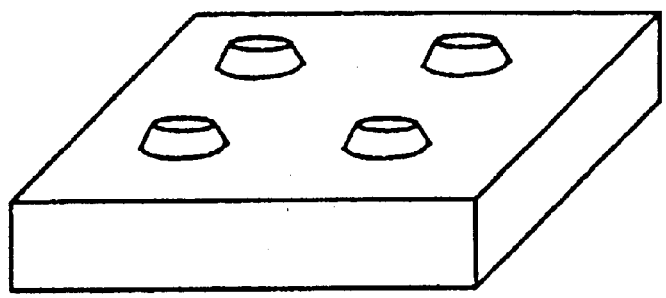
FIG. 16 is an explanatory view showing a substrate used in one embodiment of the invention.

In film formation, in addition to the influence of particles impinging directly from space (primary effect), there exists influence of source material or etching gas that is incident to by way of other portions of the film (secondary effect). In other words, as shown in FIG. 14, at the time of ordinary film formation or of sputter etching, there exists an effect that a part of the material of the film adheres again owing to recoil of the molecules at the time of the film formation or owing to jumping out by the sputter etching. That effect is more remarkable in recessed portions than projecting portions of the recessed or projecting shape, and, accordingly, bottom shapes of the formed recessed portions are shallower than in FIGS. 12 and 13, and become the shapes shown in FIG. 15. Quantity of readhesion becomes more or less in accordance with depth or shallowness of the holes or grooves, and, accordingly, as lamination proceeds, depths and shapes of the recesses are automatically adjusted to be steady-state depth and shape. Further, it is possible to flatten a surface of film having recessed or projecting patterns thereon by employing the sputter etching (if necessary) and deposition in which particles diffusively are incident to such as the ordinary sputter deposition. Of course, a substrate may be provided with periodic projections as shown in FIG. 16, without being limited to the periodic recesses.

Figure 17:
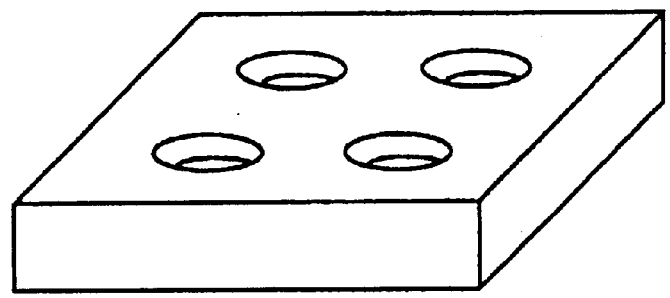
FIG. 17 is an explanatory view showing a substrate used in one embodiment of the invention.
Figure 18:
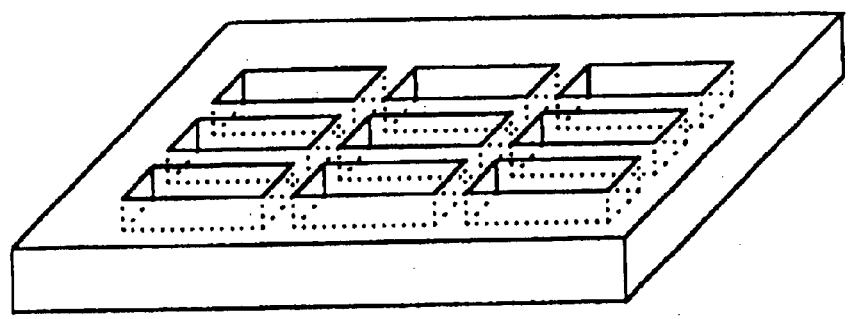
FIG. 18 is an explanatory view showing a substrate used in one embodiment of the invention.
Figure 19:
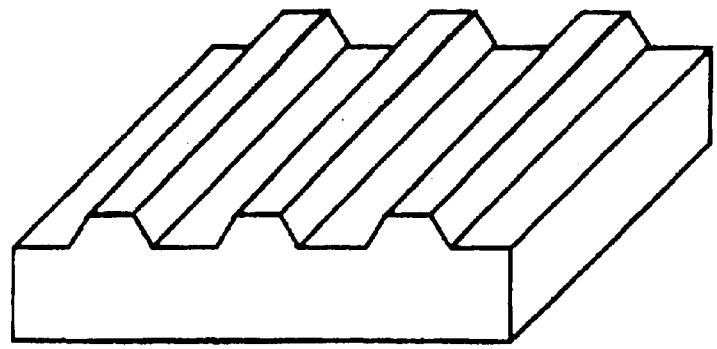
FIG. 19 is an explanatory view showing a substrate used in one embodiment of the invention.
Figure 20:
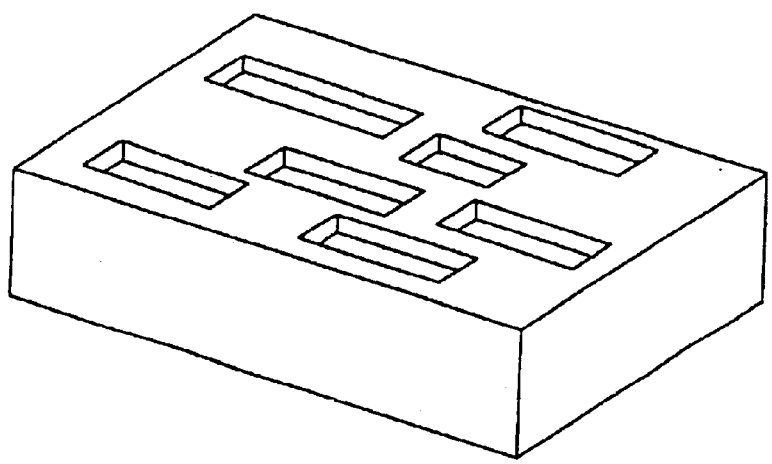
FIG. 20 is an explanatory view showing a substrate used in one embodiment of the invention.
Figure 21:
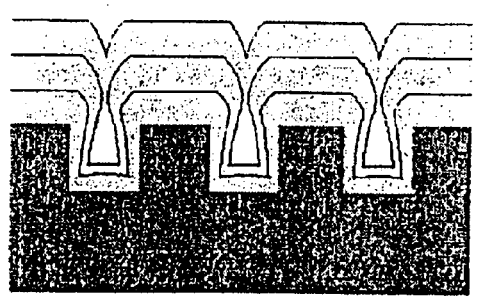
FIG. 21 is an explanatory view showing a fabrication mechanism of the invention.

For a substrate having periodically-arranged holes/grooves as shown in FIGS. 17, 18 and 19, or a substrate having non-periodically-arranged holes/grooves as shown in FIG. 20, it is possible to shape bottoms of the holes/grooves to be sharp by simultaneously carrying out sputter etching and deposition in which particles diffusively are incident to such as the ordinary sputter deposition, on the substrate. Further, by carrying out a deposition method in which particles diffusively are incident to such as the ordinary sputter deposition on the above-mentioned substrate or on a film formed on the substrate to preserve locations of the recessed and projecting patterns of the substrate, it is possible to form cavities in shapes of holes or grooves in the inside as shown in FIG. 21, while forming a film on the surface so as to provide holes/grooves which coincide with the locations of the recessed and projecting patterns of the substrate as shown in the same figure. These two processes (i.e., shaping of the sharp bottoms and forming of the cavities) may be carried out individually or in combination in any order. Further, it is possible to flatten a surface of a film having recessed and projecting patterns by employing sputter etching (if necessary) and deposition in which particles diffusively are incident to such as the ordinary sputter deposition. This has a very wide range of application.

Here, a method of fabricating another structure will be described. In the structure described referring to FIG. 1, two kinds of materials have thicknesses of a same degree. However, as described below, on a recessed or projecting surface of a single main component (host) forming a structure, can be laminated a different kind of functional material (guest) to be far thinner than the host, and this lamination can be repeated periodically. Namely, supposing that the guest is not introduced, the host has uniform structure. In other words, it is possible to manufacture a structure in which three-dimensional periodic structure of the guest is embedded in the uniform host material. Also, it is possible to similarly form a host-guest type three-dimensional periodic structure in which the host itself is a periodic structure consisting of two or more film materials thicker than the guest. Referring to FIG. 1, if all shapes of the surfaces of the material A and the material B are same, there is no problem. Even when the surface of A does not coincide with the surface of B, periodicity is kept if As have the same shape and Bs have the same shape in different layers.

[Embodiment 2]

Figure 22:
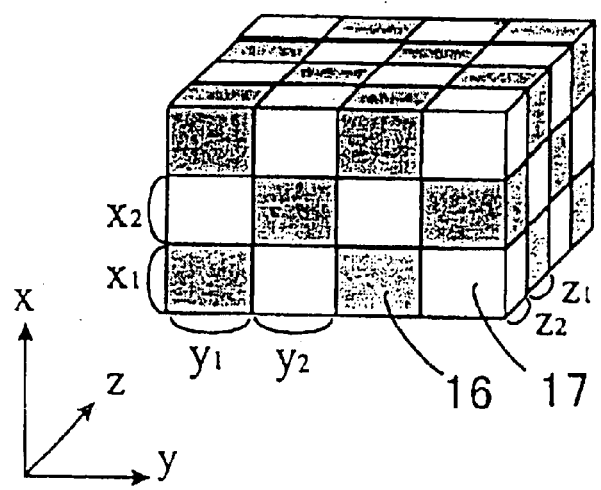
FIG. 22 is a view for explaining characteristics of a three-dimensional periodic structure.

With regard to a three-dimensional periodic structure comprising a transparent body and having a period of about half a light wavelength within the medium, the effect of photonic bandgap was theoretically predicted, and the theory has been verified by a model experiment of the microwave band (for example, a band of a wavelength of 3 cm). To explain the three-dimensional periodic structure, a concept of the three-dimensional periodic structure is shown in FIG. 22. The three-dimensional periodic structure consists of transparent bodies 16, 17 of thicknesses $d_1$, $d_2$ and refractive indexes $n_1$, $n_2$ ($n_1 > n_2$), and the structure has periods of $x_1+x_2$, $y_1+y_2$, and $z_1+z_2$ in the directions of x, y and z, respectively. For the sake of simplicity, it is assumed that both $x_1+x_2$ and $y_1+y_2$ are sufficiently larger than $z_1+z_2$ ($z_1$, $z_2$ have the same meaning as $d_1$, $d_2$) and an equation:

$$n_1 d_1 = n_2 d_2$$

is satisfied. As obvious from this description, with regard to a function, the three-dimensional periodic structure includes one-dimensional periodic structure and two-dimensional periodic structure. This is valid not only to the present embodiment but also all through the present application. A wave propagating in the direction of z has a property described in the following. In a range of light wavelength centering at a certain free space wavelength $\lambda_0$:

$$\lambda_l < \lambda < \lambda_u,$$

a light wave propagating in the direction of +z decreases exponentially in its amplitude as it proceeds, and, accordingly, can not propagate. It is similar to the direction of −z. The condition satisfied by $\lambda_0$ is:

$$\lambda_0/4 = n_1 d_1 (= n_2 d_2),$$

and $1/\lambda_l$ and $1/\lambda_u$ are obtained by the following equations:

$$1/\lambda_l = (4/\pi\lambda_0)(\tan^{-1}(n_1/n_2)^{1/2})$$

$$1/\lambda_u = (4/\pi\lambda_0)(\tan^{-1}(n_2/n_1)^{1/2}).$$

When $n_2/n_1$ is close to 1, the following equation is given:

$$(\lambda_u - \lambda_l)/\lambda_0 \sim (4/\pi)((n_1/n_2)^{-1})$$

where ($\lambda_0$ is almost at the center of $\lambda_u$ and $\lambda_l$).

This phenomenon is termed Bragg cutoff. The center wavelength in the cutoff is proportional to the length of the period. The width of the wavelength band in which the cutoff appears approaches 0 when $n_1$ and $n_2$ nearly coincide, and the width becomes a considerable part of $\lambda_0$ as n1/n2 becomes large. Accordingly, light whose wavelength is somewhat different from so-called Bragg wavelength $\lambda_0$ is also cut off when the ratio $n_1/n_2$ is sufficiently large. Now, it is assumed that the constituent materials are a-Si (refractive index: 3.24) and $SiO_2$ (refractive index: 1.46). When, in this material system, $1/\lambda_l$, $1/\lambda_u$ are obtained from the above-mentioned equations, they are smaller by 25% and larger by 25% in comparison with $1/\lambda_0$, respectively.

Further, by means of an aqueous solution of HF, it is possible to selectively dissolve $SiO_2$, leaving Si. When its place is filled with, for example, air, the refractive indexes in this system become 3.24:1, and similarly, $1/\lambda_l$ and $1/\lambda_u$ become smaller by 35% and larger by 35% in comparison with $1/\lambda_0$.

Hereinabove, for convenience of explanation, it is assumed that $x_1+x_2$ and $y_1+y_2$ are sufficiently larger than $z_1+z_2$. Generally, however, it is desired that periods in x-, y-, and z-directions be of same degree, in many cases. In a three dimensional periodic structure, it is seen that a wave that goes in an optional direction has different periods for respective solid angle directions, and thus has respective cutoff wavelength bands for solid angle directions. When light having a particular free space wavelength $\lambda_S$ is contained in common in the cutoff wavelength bands of all the three-dimensional directions, it is possible to completely confine the light of the wavelength $\lambda_S$ within that three dimensional periodic structure. As described above in outline, the effect that propagation of light of certain wavelength region is forbidden in all the directions or directions in certain range in space is termed Photoic Bandgap effect.

Figure 9:
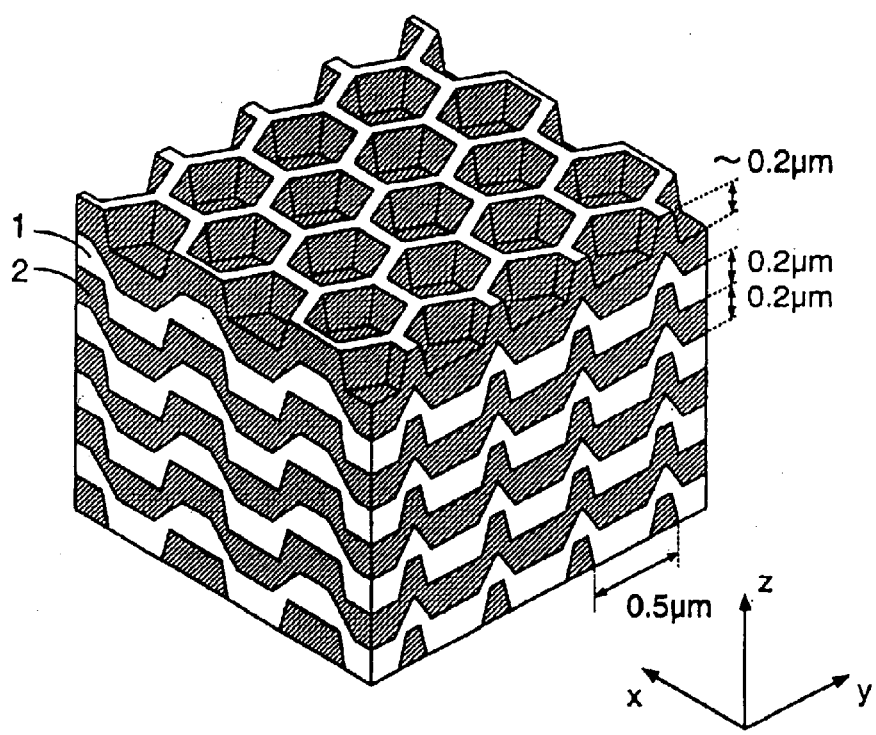
FIG. 9 is an explanatory view showing one embodiment of the invention.

As an example, a periodic structure is formed as shown in FIG. 9. Its periods in the directions of x, y and z are 0.87 μm, 0.5 μm and 0.4 μm, respectively. The material system consists of a-Si and $SiO_2$. Periodicity of dozens of periods has been verified.

Figure 23:
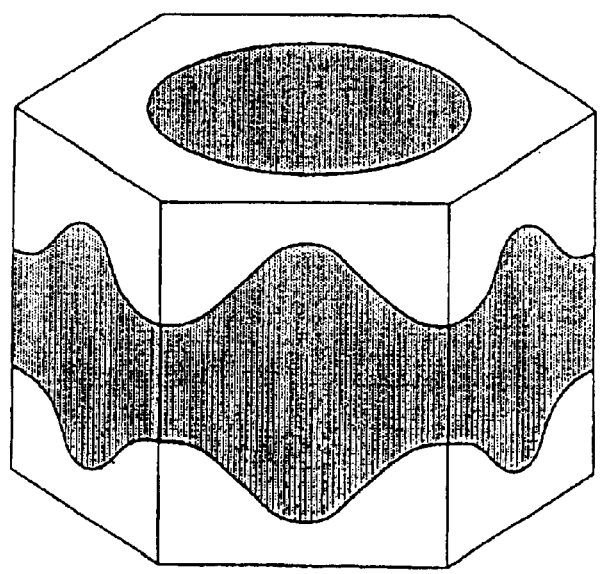
FIG. 23 is an explanatory view showing a Brillouin zone, whose structure is hexagonally symmetric in the xy plane and periodic in the z direction.

In detail, in a structure that is hexagonally symmetric in the xy plane and periodic in the z direction, the so-called Brillouin zone takes a form, for example, shown in FIG. 23. The origin of the wave number is the center of the hexagonal pillar. When the ratio $n_1/n_2$ is sufficiently large, the wavelength $\lambda_S$ in question is contained in common in the cutoff areas at whole the surfaces of the Brillouin zone, and accordingly, no wave is radiated. When $n_1/n_2$ becomes smaller than that, $\lambda_S$ is included in common in the cutoff areas for the surface except for white parts in the figure, and sufficient for many applications as described below. Namely, a radiation wave that goes from the center of the hexagonal pillar toward a point within the gray areas is suppressed and cut off.

Although the term "periodic structure" is used in the present embodiment and all through the present application, it is not limited to the case in which periodicity is strictly realized, of course. Small variation from periodicity defined in fabricating conditions has small effect. Or, by intentionally disturbing periodicity slightly, following effects can be produced.

Figure 24:
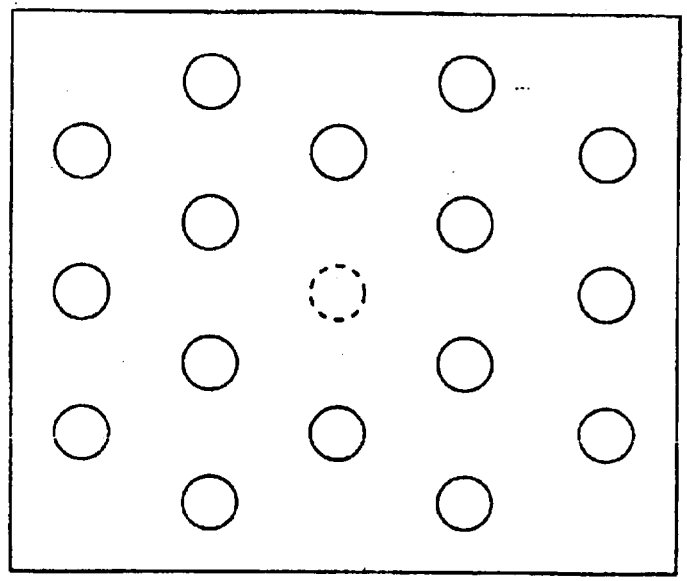
FIG. 24 is an explanatory view showing one embodiment of the invention, a circle of the dashed line meaning that a round hole shown by the solid line does not exist in that place where it should exist originally.

When a substrate is manufactured to omit one or a few holes out of periodic ones on the substrate as shown in FIG. 24, and an $SiO_2/Si$ periodic structure is formed on that substrate as described in Embodiment 1, a periodicity-disturbed portion is formed linearly in the direction perpendicular to the substrate. Light wave can be propagated along such an area, and thus, it can be used as an inlet/outlet that connects between the peculiar space in which radiation is prohibited and the outside space. Thus, such disturbance in a periodic structure is useful.

Similarly, point disturbance, finite linear disturbance, or loop disturbance in a three-dimensional photonic bandgap structure operates as a resonator.

Figure 25:
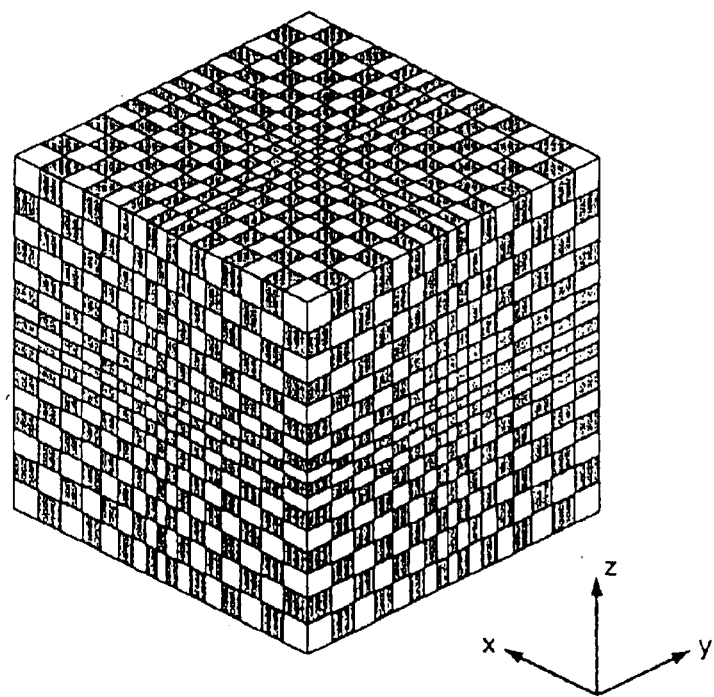
FIG. 25 is an explanatory view showing one embodiment of the invention.

FIG. 25 shows a three-dimensional photonic bandgap structure, which is fabricated by the method of Embodiment 1, gently varying periods spatially in all three axial directions, in the direction of lamination and within the substrate plane. With regard to light having a specific direction within the three-dimensional photonic bandgap structure, there exists a part in which its period satisfies Bragg cutoff condition, in a suitable position within the space, and the light turns back at that area. Thus, photonic bandgap property is guaranteed in a wide range of wavelength and in a wide range of solid angle. Of course, it can be extended so that a period is modulated only in the z direction without being modulated in the x and y directions, for example.

[Embodiment 3]

Figure 26:
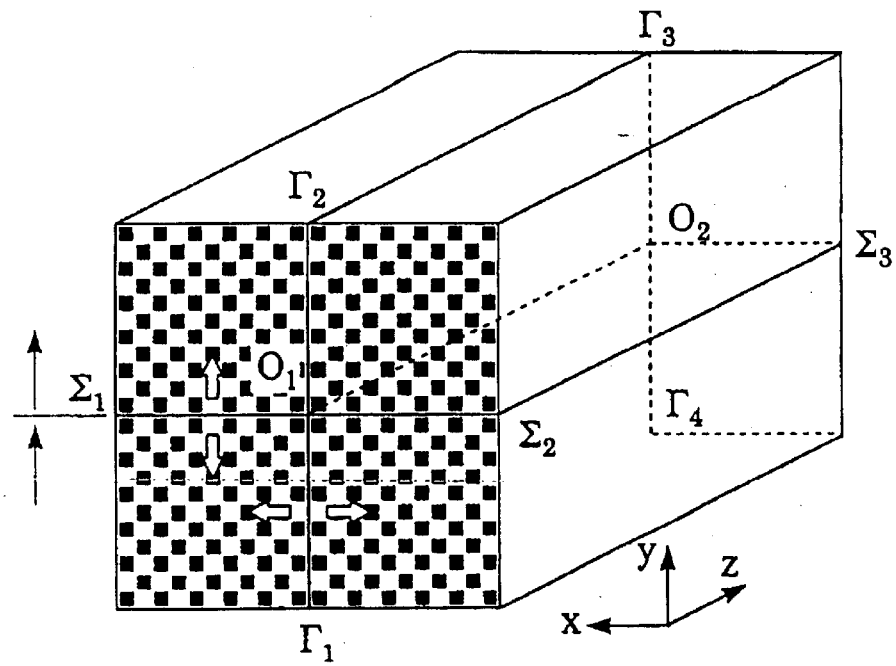
FIG. 26 is an explanatory view showing one embodiment of the invention.
Figure 27:
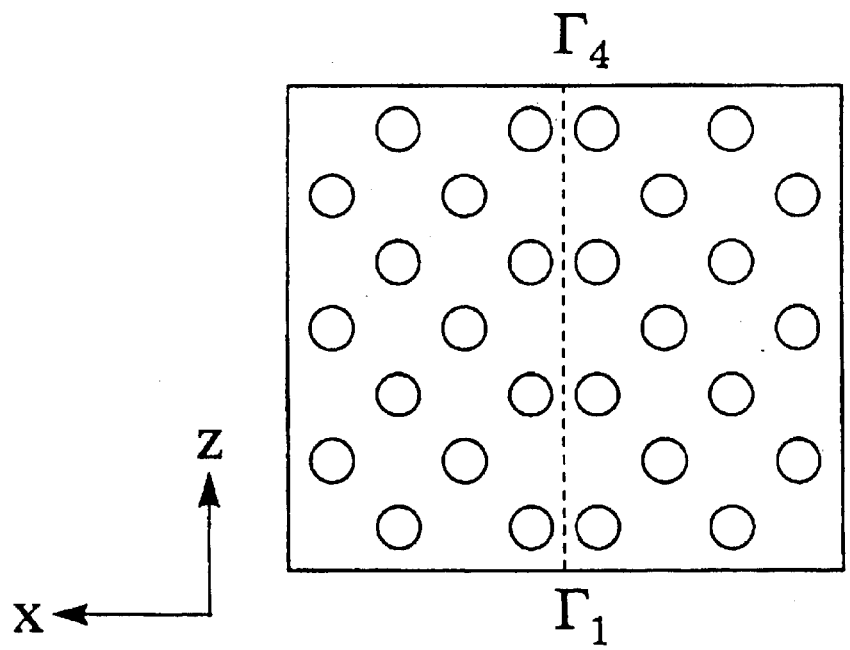
FIG. 27 is an explanatory view showing one embodiment of the invention.

The present embodiment relates to fabrication methods for circuit elements in the three-dimensional photonic bandgap structure, such as a waveguide for putting in and taking out light from the outside, a resonator for selecting wavelength in the inside, a branch, and the like. As described above referring to FIG. 24, it is possible to put in and take out light in the direction perpendicular to the laminated surface. FIG. 26 illustrates a method of forming a circuit element of a rectangular lattice. On a silica substrate, are formed array of holes as shown in FIG. 27. Here, along the line $\Gamma_1\Gamma_4$, displacement is given to the period in the x direction. On that substrate, $Si/SiO_2$ are laminated employing the process of Embodiment 1. After the lamination is repeated sufficient times, the displacement shown in FIG. 26 is given in the thickness-wise direction of the lamination in the pane $\Sigma_1\Sigma_2\Sigma_3$. By this method, it is possible to localize light power in the neighborhood of the line $O_1O_2$, and to propagate it along $O_1O_2$.

In this structure, the following takes place. Owing to the displacement in the plane $\Gamma_1\Gamma_2\Gamma_3$, light decreases exponentially in its amplitude as it goes away from a $\Gamma_1\Gamma_2\Gamma_3$ both to the left and to the right, and thus the wave localizes along $\Gamma_1\Gamma_2\Gamma_3$. Further, owing to the displacement in $\Sigma_1\Sigma_2\Sigma_3$, light decreases exponentially in its amplitude as it goes away from $\Sigma_1\Sigma_2\Sigma_3$ both upward and downward. From both actions, wave localizes along $O_1O_2$ and its propagation in that direction is caused.

Figure 28:
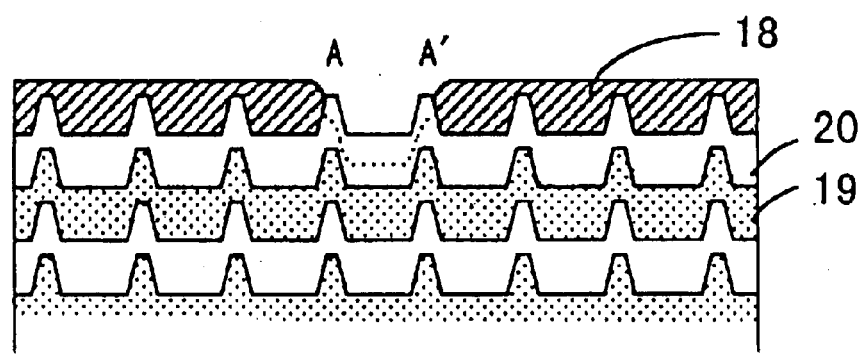
FIG. 28 is an explanatory view showing one embodiment of the invention.

Differently from formation of a propagation path by utilizing displacement of periodicity, it is possible to form a propagation path by introducing a portion that has different refractive index. FIG. 28 shows a yz cross-section of the $Si/SiO_2$ three-dimensional periodic structure of FIG. 1 under fabricating, in a state that $SiO_2$ has been laminated. Resist for lithography 18 is provided on the surface, and a width AA' of one period or several periods in the y direction is removed by lithography. Through a strip opening AA', a part of $SiO_2$ is removed by dry etching, or it is removed more deeply, as shown by the dashed line. Then, Si is filled back to that place by sputtering. After returning to an almost original surface, the resist for lithography is removed by the liftoff technology. By this operation, the periodic structure of the recessed and projecting patterns of the surface is kept, and on that surface, film formation is continued many times in the z direction in accordance with Embodiment 1. In thus-described process, the dry etching operation on $SiO_2$ or the filling back operation of Si may be omitted, unless it injures the y direction periodicity of the cross-section. Further, in the above-described structure, the roles of Si and $SiO_2$ may be interchanged.

Owing to this fabrication method, it is possible to realize wavelength-selective resonance, branching, coupling, and reflection of light. Since radiation is suppressed or directions in which radiation takes place are limited in these circuits, radiation loss is decreased and it is possible to realize a construct ion that can not be realized in the conventional optical circuits owing to excessive radiation loss. Namely, giving an example of FIG. 23, if the gray portions cover the directions in which strong radiation is produced from a circuit in question, it is possible to prevent radiation loss. Respective circuits are shown in the following, as transparent views seen from a top surface.

Figure 29:
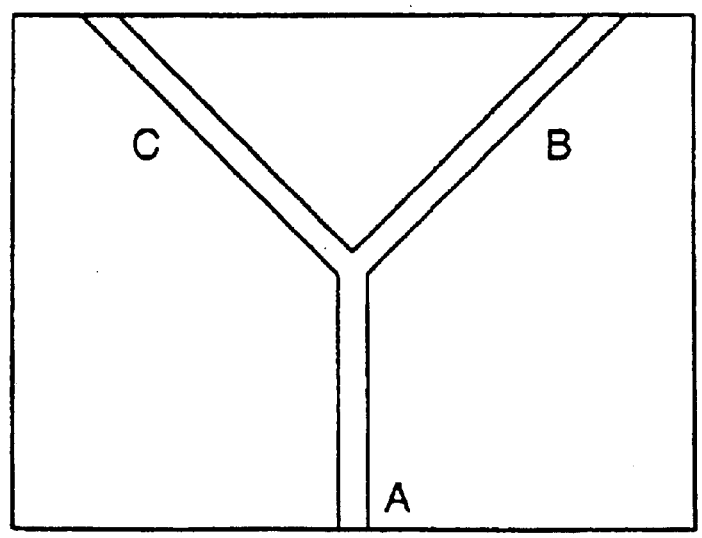
FIG. 29 is an explanatory view showing one embodiment of the invention.

In FIG. 29, light wave from an incident waveguide A is branched into B and C.

Figure 30:
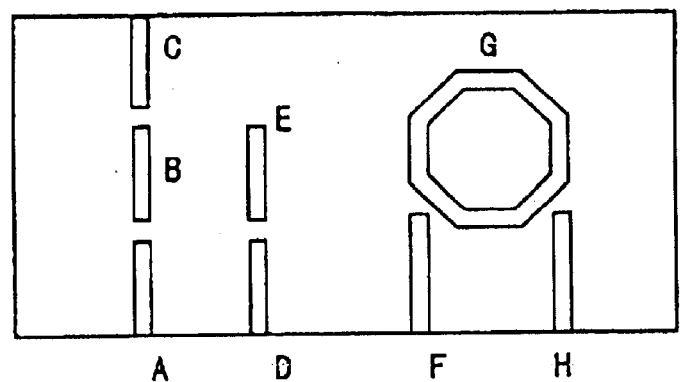
FIG. 30 is an explanatory view showing one embodiment of the invention.

FIG. 30 illustrates three types of resonators. In the neighborhood of the wavelength that satisfies the condition for light wave to form a standing wave in the resonator B, light wave is transmitted from A to C. In other cases, wave is reflected. The resonator E is coupled with D only. In a condition other than the resonance condition, wave that entered through D is all reflected except for an internal loss portion. Under the resonance condition, both internally-stored energy and loss (material loss, and, if stays behind, small radiation loss) increase, and accordingly, the reflection coefficient decreases. When, in the ring-shaped resonator G, light wavelength just satisfies the standing wave condition, transmission from F to H is realized.

Figure 31:
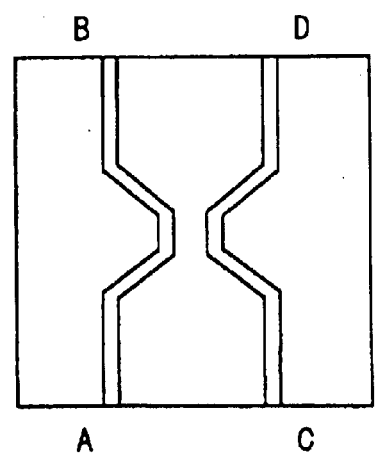
FIG. 31 is an explanatory view showing one embodiment of the invention.

In FIG. 31, the waveguides AB and CD approach each other in a limited area, and both waves that decrease exponentially in the transverse direction overlap each other to realize give and take of power, i.e., coupling between the two waveguides.

Figure 32:
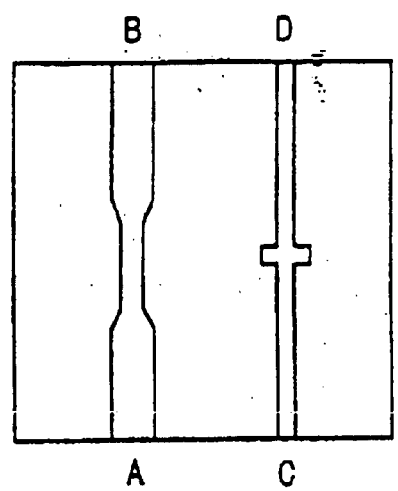
FIG. 32 is an explanatory view showing one embodiment of the invention.

FIG. 32 shows a circuit in which a narrow part is located between A and B to generate partially reflecting wave, and a circuit in which short stubs are provided between C and D to generate partially reflected wave.

Further, in order to form a portion of a different refractive index, a mask is formed by lithography similarly to FIG. 28, and thereafter, ion-implantation may be utilized. Thus, it is possible to form a waveguide, resonator, branch, coupler, reflector, and the like.

Figure 33:
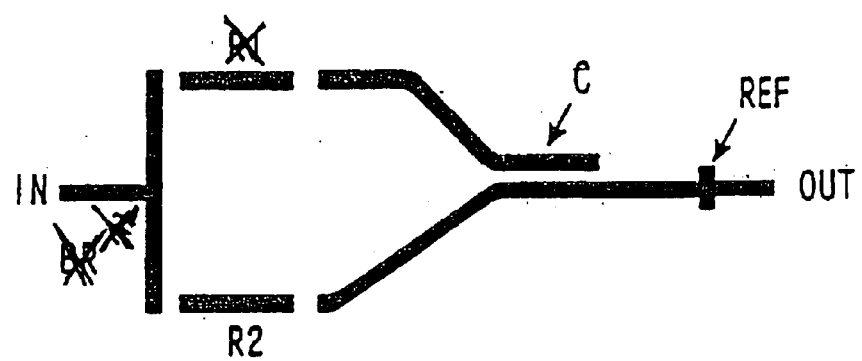
FIG. 33 is an explanatory view showing one embodiment of the invention.

Referring to FIG. 33, there will be exemplified and described an effect that connection of optical circuits becomes epochally free in the structure (PBS, Photonic Bandgap Structure) in which radiation is suppressed, light coming from the left through a waveguide IN follows courses separated above and below. The light passing through the lower branch is transmitted through a resonator R2, or reflects at R2. The transmitted wave proceeds to a coupler C. The component passing through the above branch behaves similarly, and the transmitted component proceeds to the coupler C and is coupled with a waveguide running in parallel. The combined signal wave is partially reflected by a reflector REF, and partially proceeds to an output terminal OUT.

It is practically impossible to carrying out thus-described operations in a conventional optical integrated circuit owing to excessive radiation loss. However, inside PBS, those operations can be carried out similarly to the connections of electric circuits, and the degree of freedom for optical circuit design epochally increases.

Figure 34:
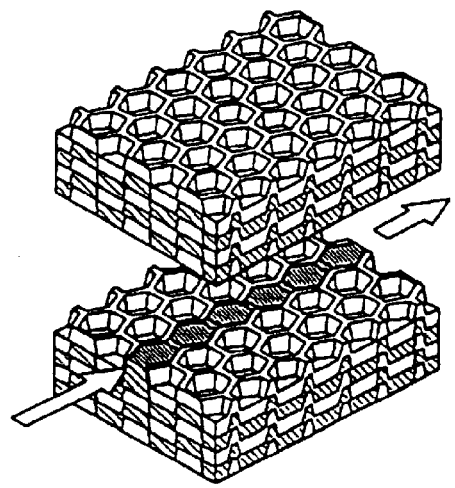
FIG. 34 is an explanatory view showing one embodiment of the invention.
Figure 35:
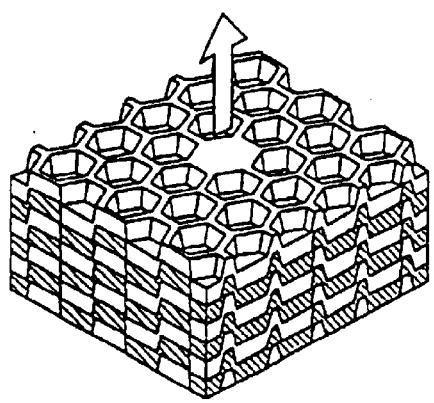
FIG. 35 is an explanatory view showing one embodiment of the invention.
Figure 36:
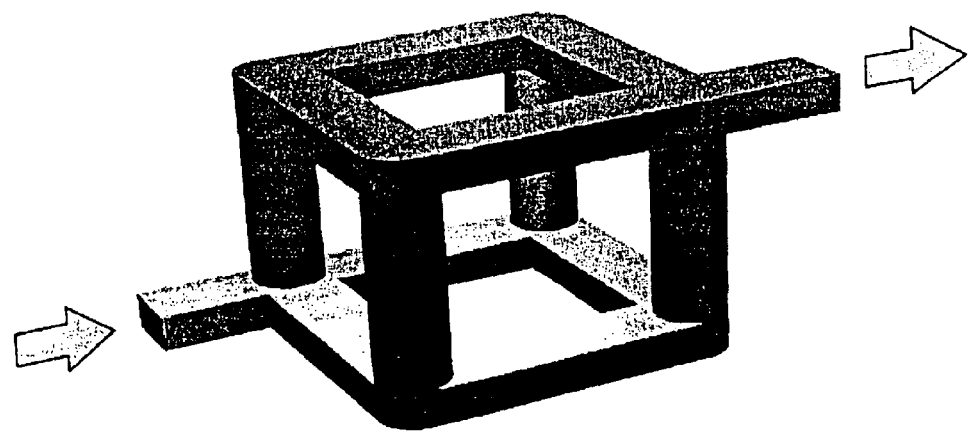
FIG. 36 is an explanatory view showing one embodiment of the invention.

By combining a waveguide parallel to the plane, which is shown in FIG. 34, and a waveguide perpendicular to the plane, which is shown in FIG. 35, it is possible to construct a three-dimensional optical circuit, an example of which is shown in FIG. 36. The conventional optical circuit technique reaizes an optical circuit within one plane at the utmost. Thus, the present technique can put the degree of freedom for optical circuit design/fabricating on a literally new level.

[Embodiment 4]

Figure 37:
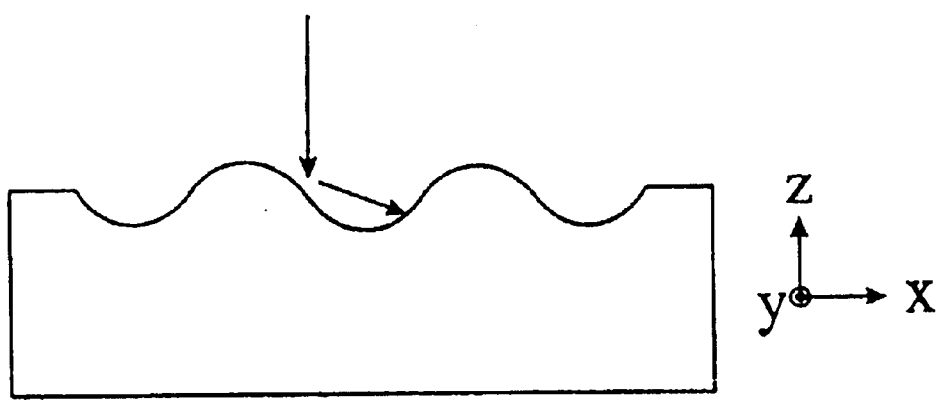
FIG. 37 is an explanatory view showing selective lamination used in one embodiment of the invention.

In the following, there will be described a method of selectively introducing functional material into recessed portions and projecting portions of a two-dimensional recessed or projecting periodic structure on a surface. It will be shown that, both in lamination and in etching, there exist effects that a top portion and a valley portion are much more laminated and etched, respectively. FIG. 37 shows a state that a particle of source material is incident to a substrate having recessed and projecting patterns. Phenomenon that particles arriving at the substrate do not adhere but recoil to arrive again at and adhere to the substrate is more frequent on the recessed portions. Namely, the phenomenon that particles of the source material recoil has an effect that they are deposited selectively more on the recessed portions.

Figure 38:
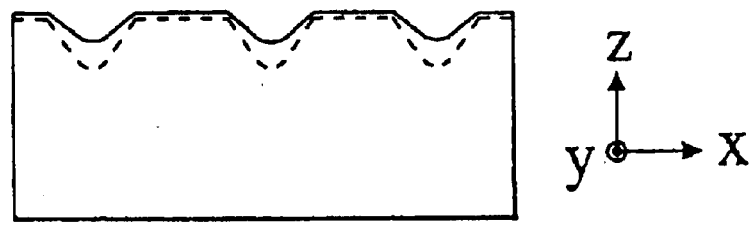
FIG. 38 is an explanatory view showing selective etching used in one embodiment of the invention, by which a profile of the solid line is changed to a shape of the dashed line.
Figure 39:
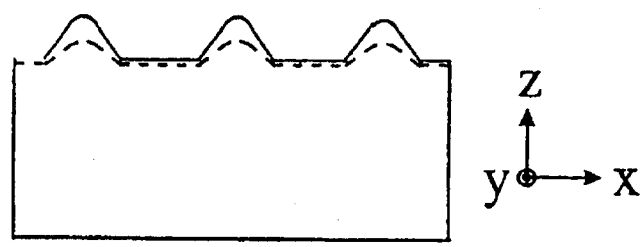
FIG. 39 is an explanatory view showing selective etching used in one embodiment of the invention, by which a profile of the solid line is changed to a shape of the dashed line.

Further, the recessed portions become in shadow of the projecting portions, blocking off incident particles, and thus, it has an effect that deposition becomes smaller on the recessed portions than on the projecting portions. On the other hand, owing to thermal energy, adhered particles can move about on the surface of the substrate. This is termed migration. In migration, there arise such movement that particles are, so to speak, accumulated from portions of higher average temperature to portions of lower average temperature. On the substrate, the recessed portions are usually of higher temperature than the projecting portions, and accordingly, there arises movement from the recessed portions to the projecting portions. Similarly in sputter etching, there are a mechanism that the recessed portions are etched much more, and conversely, a mechanism that the projecting portions are etched much more. Namely, also in sputter etching by gaseous ions, there exist recoil-ions, which erode the recessed portions much more than the projecting portions. On the other hand, as described above referring to FIG. 8, an inclined portion is etched more deeply than a horizontal plane. Thus, if a surface has a shape of FIG. 38, valley portions are etched much more, and if a surface has a shape of FIG. 39, top portions are etched much more.

To sum up the above, by suitably selecting various conditions such as film forming condition, sputter etching condition, shadowing effect, easiness of movement of surface particles, surface shape, and the like, it is possible, in deposition, to form a film so as to make top portions thicker or to make valley portions thicker, and, in etching, it is possible to remove top portions more deeply or to remove valley portions more deeply.

The present invention has at least one more method of pattern formation. Functional material can be made to be deposited on flat portions of tops or valleys and not on the inclined portions. Namely, a guest material is deposited on a surface having recessed and projecting patterns to have almost uniform thickness, and successively, by employing sputter etching, the flat portions can be etched less deeply and inclined portions more deeply, so that the guest material does not remain at the inclined portions, while remaining at mountain summits and valley bottoms. i.e., at the flat portions.

Figure 40:
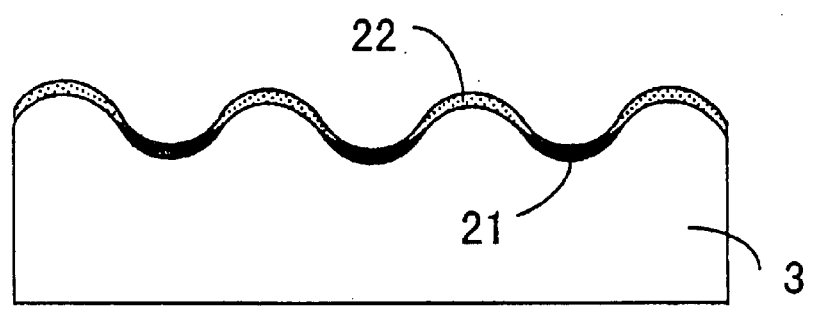
FIG. 40 is an explanatory view showing one embodiment of the invention.

FIG. 40 is for explaining a three-dimensional metal-insulator-metal (MIM) tunnel junction and its fabricating method. Similarly to Embodiment 1, a recessed or projecting pattern is formed on a substrate 3 (fused silica), and then, areas of metal 21 (for example, aluminum) are formed in its recessed portions. Oxygen is temporaly introduced to oxidize the surface of 21, and furthermore, areas of metal 22 are formed on the projecting portions. Here, however, it is possible that Al is used only to make an insulating film (alumina), and metals 21, 22 are selected from Pt, W, Ti, or the like. Then, over the processed surface, a recessed or projecting pattern of $SiO_2$ is formed, and by repeating these processes subsequently, it is possible to form a high-density three-dimensional array of metal-insulator-metal tunnel junctions. Thus, it is possible to realize a miniature high efficient device as a detector of microwave (including millimeter wave and submillimeter wave). Of course, in FIG. 40, the pattern on the xy plane may be modified to a linear or parallel-rod like pattern by extending it in the y direction to make the whole structure a two-dimensional pattern.

Figure 41:
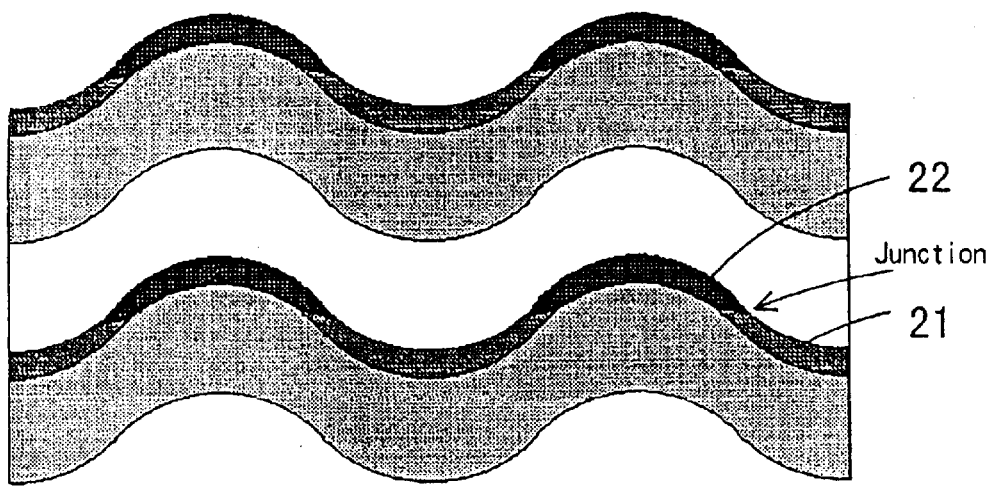
FIG. 41 is an explanatory view showing one embodiment of the invention.
Figure 42:
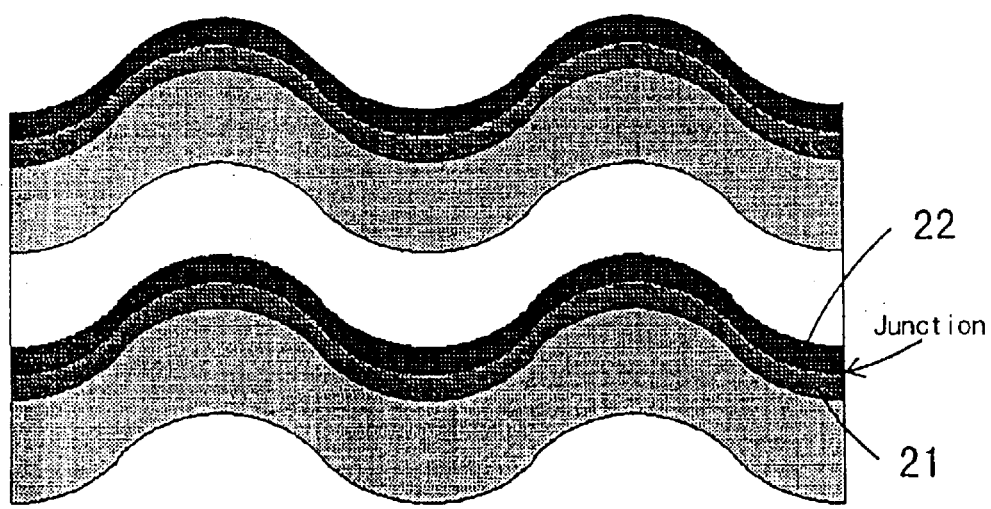
FIG. 42 is an explanatory view showing one embodiment of the invention.
Figure 43:
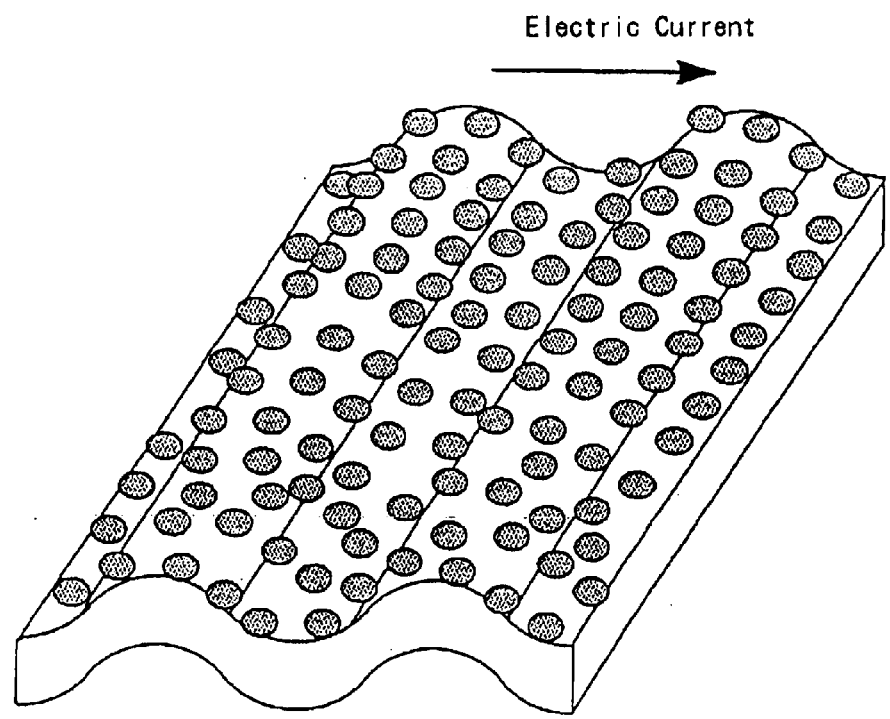
FIG. 43 is an explanatory view showing one embodiment of the invention, in which ellipses indicate island film metal and are dotted over on a curved surface.
Figure 44:
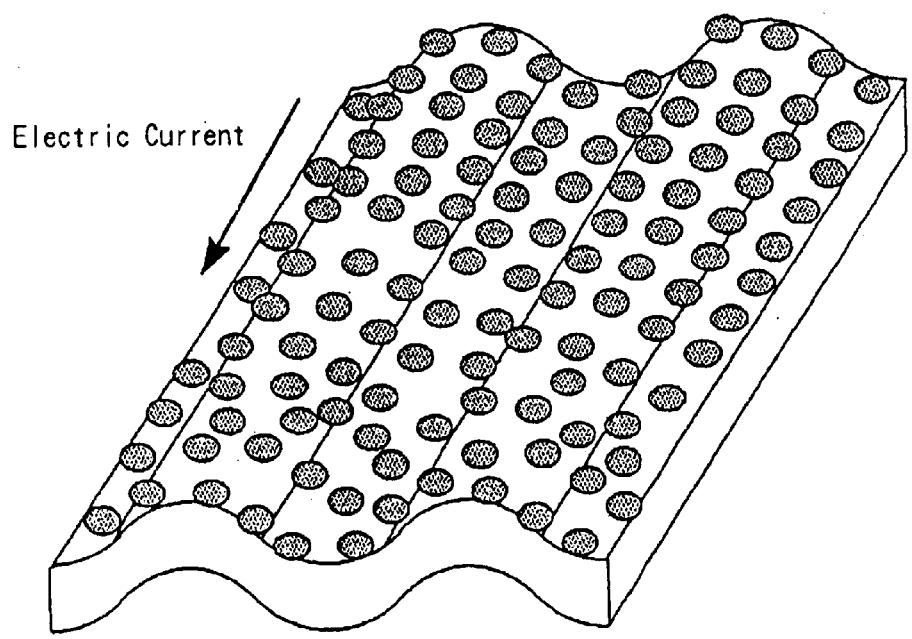
FIG. 44 is an explanatory view showing one embodiment of the invention.

Further, with regard to the MIM tunnel junction, except for the method of forming junctions in correspondence with respective periods in the transverse direction (FIG. 41), it is also possible to employ a laminating method as shown in FIG. 42, or a method of using island films as shown in FIGS.

43, 44 to make tunneling current flow. However, in the cases of FIGS. 41 and 42, if the metal film is thick, light does not permeate in the laminating direction (z direction), which restricts a manner of combining it with PBS. For example, it is possible to employ methods of using the forms shown in FIGS. 45, 46 and 47 (in the figures, FU (Functional Unit) is a complex of the MIM tunnel structure), or a method in which lamination is formed and light is propagated in the direction parallel to the surface. If the film thickness is thin, this kind of restriction does not exist. Further, as an application method of MIM, application to switching, detection/mixing, and the like utilizing the nonlinear I-V characteristic, and application utilizing light emission (plasmon emission) caused by carrier injection can be used. In the case of using an electric function such as switching by means of electric characteristic such as nonlinear I–V characteristic or the like, an opaque host material may be used.

[Embodiment 5]

In a three-dimensional periodic structure consisting of two or more kinds of materials, conductive material such as SiC or Si may be used as construction material. For example a heterojunction optical receiver may be formed in that structure. Thus, it is possible to fabricate a device having a property resulting from unification of an electronic element and an optical element utilizing the photonic bandgap (PBG) effect.

In the following, more detailed description will be given. In preparation for it, methods for introducing functional material (referred to as F) or a functional unit (FT) into a photonic bandgap structure (PBS) are classified into the following three types.

Figure 45:
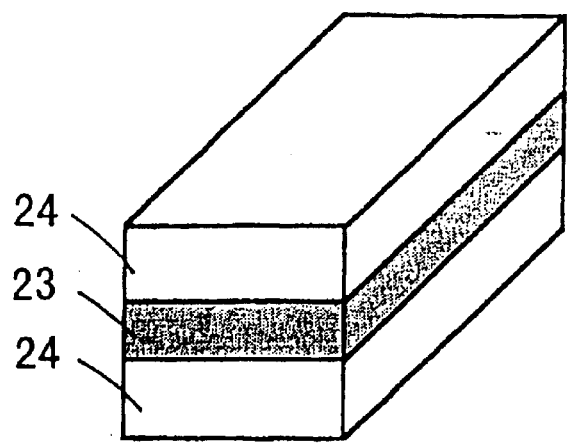
FIG. 45 is an explanatory view showing one embodiment of the invention.
Figure 46:
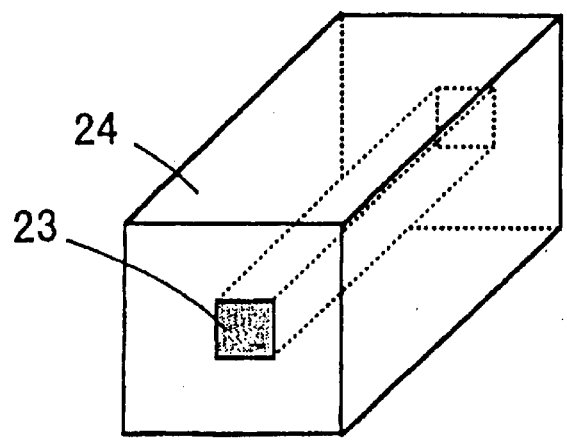
FIG. 46 is an explanatory view showing one embodiment of the invention.
Figure 47:
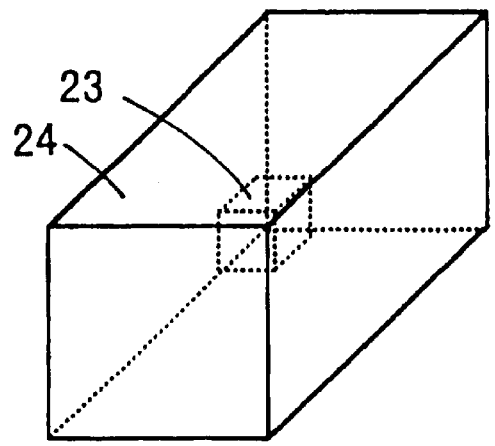
FIG. 47 is an explanatory view showing one embodiment of the invention.
Figure 48:
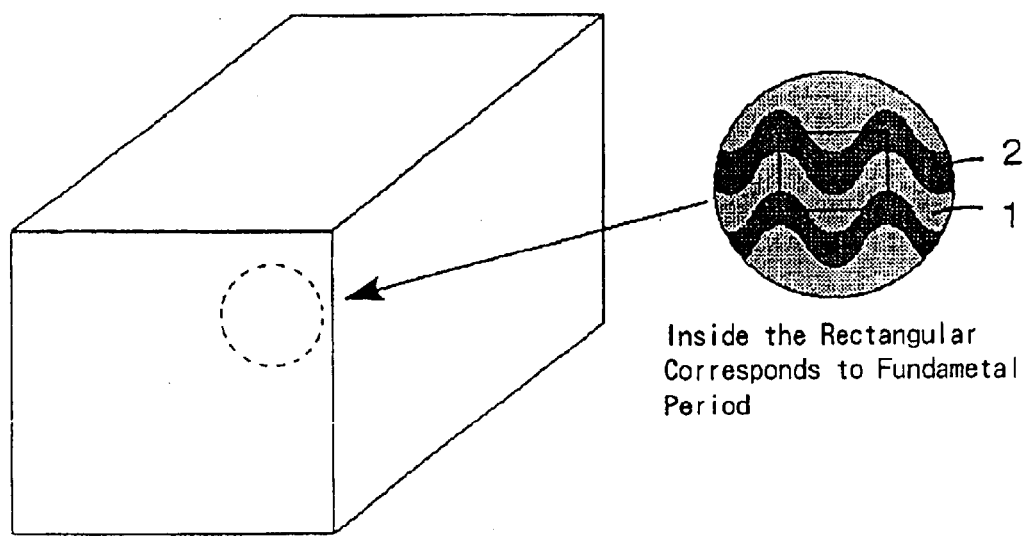
FIG. 48 is an explanatory view showing one embodiment of the invention.

(a) Methods in which FU is introduced into a form (area) enclosed by a PBS structure (FIGS. 45, 46, and 47).
(b) Methods in which F is used by inserting it into a part of material ($SiO_2$ or a-Si) that is used periodically to constitute PBS (FIG. 48).
(c) Methods in which functional material constitutes one of materials that are used periodically to constitute PBS (FIG. 48).

Depending on which of the above methods is employed, construction such as semiconductor or metal structure is changed.

In the examples shown below, various examples of types (a), (b) and (c) are described. In these cases, there are at least four types of methods for arranging two materials A and B that constitute PBS, as shown in the following.

TABLE 1

|  | Type 1 | Type 2 | Type 3 | Type 4 |
| --- | --- | --- | --- | --- |
| Material A | Semi-conductor A | Composite film of two kinds of semi-conductors $A_1$ and $A_2$ | Semi-conductor A | Composite film of $A_1$ and $A_2$ |
| Material B | Semi-conductor B | Semi-conductor B | Composite film of insulating film and semiconductor B | Insulating film |

When all the materials constituting PBS are semiconductors such as Si and SiC, difference in refractive indexes becomes small and, accordingly, it becomes difficult to maintain cutoff bands or cutoff characteristic for a certain wavelength region in all the directions. However, along the direction of the main axis, bandgap is maintained. In this type of structure, conductivity is obtained in the direction of lamination, and, accordingly, various new functions can be realized. For example, by doping respective layers to be p-type and n-type, multiple or one pair of p-n structure is obtained, which gives a rectifying property. In a state that reverse bias is applied, it can be used as a pin detector, and a junction applied with forward bias can be used as a light emitting element. When one or both of the semiconductors A and B constituting PBS are constructed as a multi-layer structure of superthin films, it is possible to build in a quantum well or double barrier structure Type 2). In that case, there appear (1) negative resistance characteristics accompanying the resonant tunneling effect; (2) emission or absorption, or refractive index modulating effect accompanying injection of two-dimensional electrons/holes, in the case of a forward bias quantum well; and (3) Stark effect shown in a reverse bias quantum well (effect that absorbency coefficient and refractive index change in accordance with electric field).

Further, in a structure using insulating films (such as Type 3 and Type 4), it is difficult for electric current to flow in the laminating direction. However, there appear optical properties such as effect by quantum well thin film and injection emission of ultra-fine silicon particles dispersed in the insulating films.

[Embodiment 6]

The present embodiment describes a structure comprising material having nonlinear optical susceptibility or nonlinear material arranged in a three dimensional periodic manner within a medium, its fabrication method, and its effect. The mentioned medium may have the periodic structure described in Embodiment 2.

To clear the way of description, the conventional technique will be outlined. It is known that fine particles of Cu, Au, Ag, or the like have nonlinear susceptibility, and thus higher harmonic light can be generated by irradiating laser beam onto such fine particles formed on a glass substrate. In that case, the higher harmonics are generated from the fine particles that exist at random and uniformly on average in space, and accordingly, it is impossible to make them have constant phase relation to the fundamental laser beam.

As described in Embodiment 1, on a silica substrate, periodic recessed and projecting pattern is formed, and then, $SiO_2$ films are deposited on that substrate, with at least part of them including sputter etching process. When a film of Cu, Au, Ag, or the like is deposited on that substrate and treated with heat, larger quantities are deposited on the recessed portions than on the projecting portions owing to the recoil at the time of deposition. However, by utilizing the effect of the surface migration of the particles owing to the temperature at the time of the film formation and to ion bombardment energy, it is also possible to obtain much more lamination at the projecting portions. From these effects, a two-dimensional periodic shape is generated.

(1) On thus-processed substrate, is formed an $SiO_2$ film, and these processes are repeated subsequently. According to this method, a material having nonlinear susceptibility is arranged in three-dimensional periodic manner within the medium of homogeneous $SiO_2$. Accordingly, when higher harmonics are generated by the above-described method, there is produced constant phase difference between array elements, and, as a result of their interference, it is possible to efficiently radiate the higher harmonics in a specific direction in space. (2) On thus-obtained structure, Si film is formed, and then, (after forming a film of Cu, Au, Ag, or the like, or immediately without forming such a film) $SiO_2$ film is formed on it, there processes being repeated subsequently. According to this method, in addition to the effect of the method of (1), there is obtained effect that the number of direction in which the radiation of the higher harmonics is generated can be made one or more restricted than (1).

Not only fine metal particles but also niobate and tantalate materials such as $LiNbO_3$, $LiTaO_3$, $KNbO_3$, and the like have nonlinear optical effects and can be made as a thin film by sputtering or the like. Thus, it is possible to form such a film into a three-dimensional periodic structure by the above method of (1) or (2), to be able to utilize their nonlinear characteristics.

Figure 49:
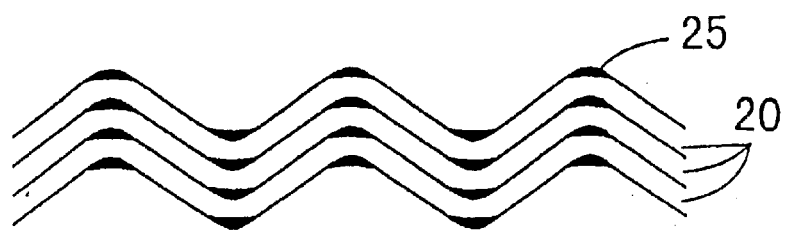
FIG. 49 is an explanatory view showing one embodiment of the invention.

Or, as shown in FIG. 49 in a cross section, $LiNbO_3$ (or $LiTaO_3$, $KNbO_3$, or the like) may be thinly sputtered on $SiO_2$ having recessed and projecting pattern, and then, only its inclined portions are removed by sputter etching to remain the top portions and the valley portions. By repeating these processes, it is possible to obtain a three-dimensional periodic structure, also.

[Embodiment 7]

As described in (1) of Embodiment 6, it is possible to introduce a second microscopic guest transparent material into a homogeneous first transparent host, to obtain a three-dimensional periodic structure. This can be utilized as a three-dimensional transmission-type or reflection-type diffraction grating. Since the guests are distributed three-dimensionally, larger diffraction cross-section can be obtained in comparison with incident wave, thus giving high diffraction efficiency. If necessary, recessed or projecting pattern on the surface can be flattened by bias sputtering.

[Embodiment 8]

Figure 50:
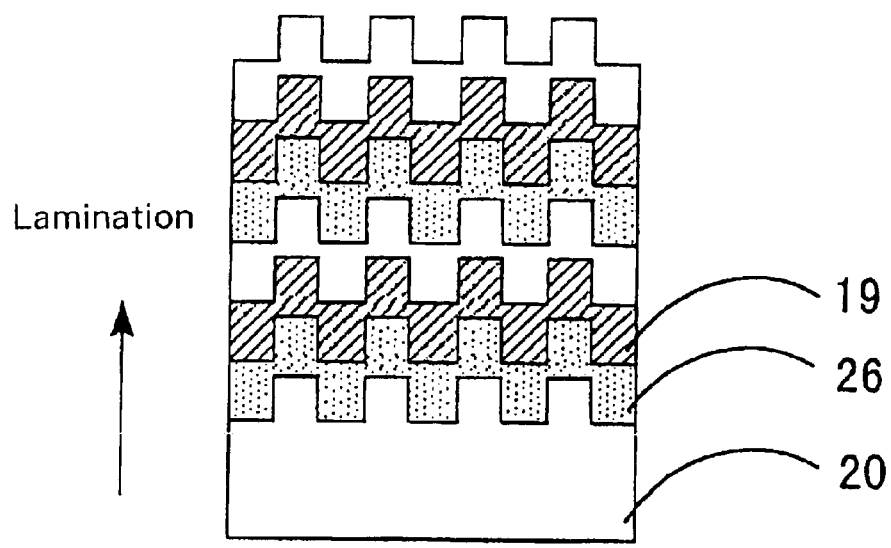
FIG. 50 is an explanatory view showing a method of fabricating one embodiment of the invention.

FIG. 50 illustrates a three-dimensional periodic structure including material having light emitting/optical amplifying functions and its fabrication method. As Embodiment 1, a recessed or projecting pattern is formed on a silica substrate, and, on it, is formed $SiO_2$ region including active elements Er. On it, is formed Si region. On it, is formed a recessed or projecting pattern of $SiO_2$, and these processes are repeated subsequently to form a three-dimensional periodic structure including the material having light emitting/optical amplifying functions.

This system can emit/amplify light of 1.5 μm wavelength region by optical pumping. The Brag cutoff effect sharply decreases a rate at which excited Er ions lose energy owing to spontaneous emission, thus giving effect of increasing light generating/amplifying efficiencies. Here, it is possible to dope Y, Nd, or the like into $SiO_2$. Except for rare earth, it is possible to realize light generating/amplifying functions by introducing microcrystals of semiconductor such as CdS into two-dimensional recessed or projecting interface under film formation, similarly to Embodiment 6.

Figure 51:
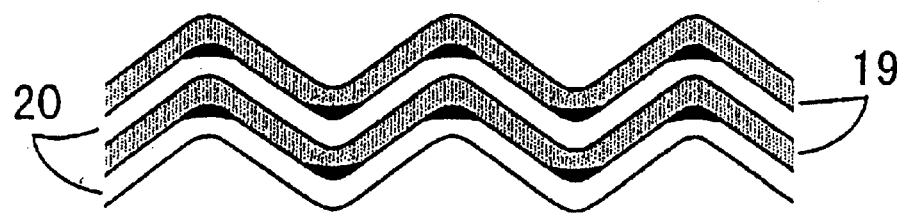
FIG. 51 is an explanatory view showing one embodiment of the invention.

As shown in FIG. 51, on a recessed or projecting surface of the material 20 ($SiO_2$), is formed a superthin film consisting of microcrystals of CdS, CdTe, or the like. Then, only inclined portions are removed by sputter etching to leave top and valley portions, and on thus-processed surface, the material 19 (Si) is deposited. By repeating these processes, it is possible to form fine crystal groups such as CdS or CdTe within PBS consisting of $SiO_2$ and Si, in a three-dimensional periodic manner. Light can be radiated by exciting CdS, CdTe, or the like, and, since there is no spontaneous recombination radiation in such directions that radiation is cut off in PBS, utilization efficiency of the excited-state molecules is high.

[Embodiment 9]

The present embodiment describes a structure in which material having electro-optic effect is arranged within a three-dimensional periodic structure, an example of its fabrication method, and its operation and effects.

Periodic recessed and projecting pattern is formed on a silica substrate as described in Embodiment 1. Films of $SiO_2$ and Si are formed sequentially (including sputter etching processes). Si is non-doped. Then, one or several periods of $SiO_2$/Si films are formed as an electrode. Here, as Si, n-type (or $n^+$) or p-type (or $p^+$) is used. By these, it is possible to form a conductive layer maintaining the PBS characteristic.

By introducing liquid crystal material into the inside of PBS, and by applying voltage through thus-described electrode, it is possible to control orientation of the liquid crystal so as to control birefringence and refractive index. Thus, a variable wavelength resonator can be formed.

[Embodiment 10]

By building in a light emitting element such as a semiconductor laser within a three-dimensional periodic structure, it is possible to suppress radiation of spontaneously-emitted light originally existing in the light emitting element. This makes threshold electric current very small.

Figure 52:
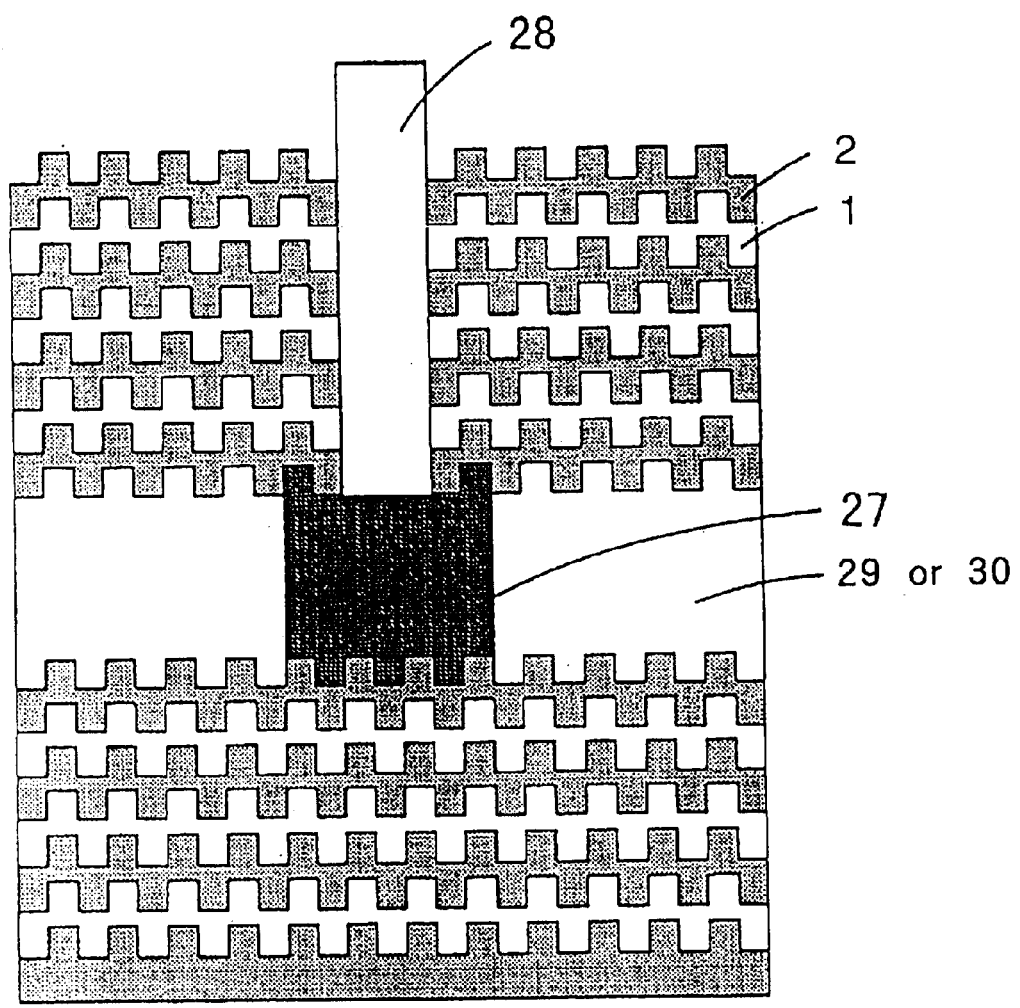
FIG. 52 is an explanatory view showing one embodiment of the invention.

FIG. 52 shows a structure in which a surface emitting laser or microcavity laser is produced within a three-dimensional PBS. Except for coupling of the laser in question with an output waveguide, spontaneous recombination radiation is remarkably suppressed in other directions. Thus, favorably, operation threshold of the laser is reduced.

Figure 53:
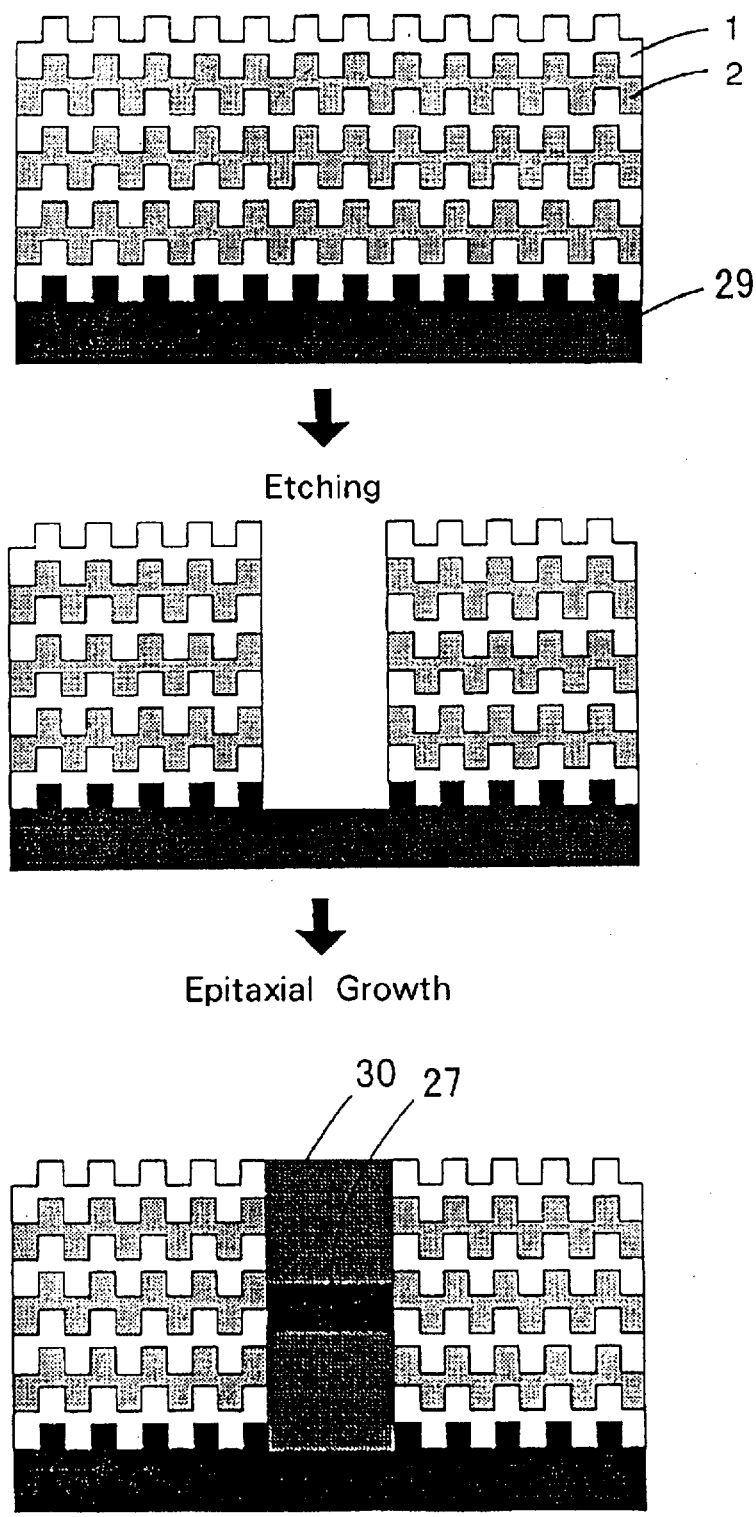
FIG. 53 is an explanatory view showing one embodiment of the invention.
Figure 54:
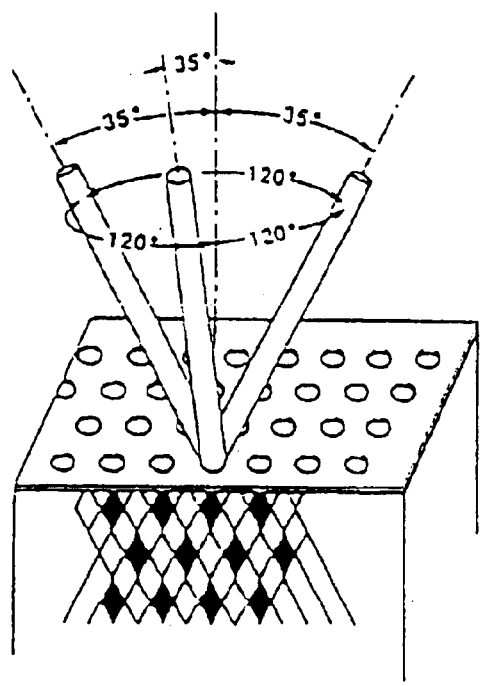
FIG. 54 is an explanatory view showing a method of fabricating a three-dimensional periodic structure that does not use the present invention.
Figure 55:
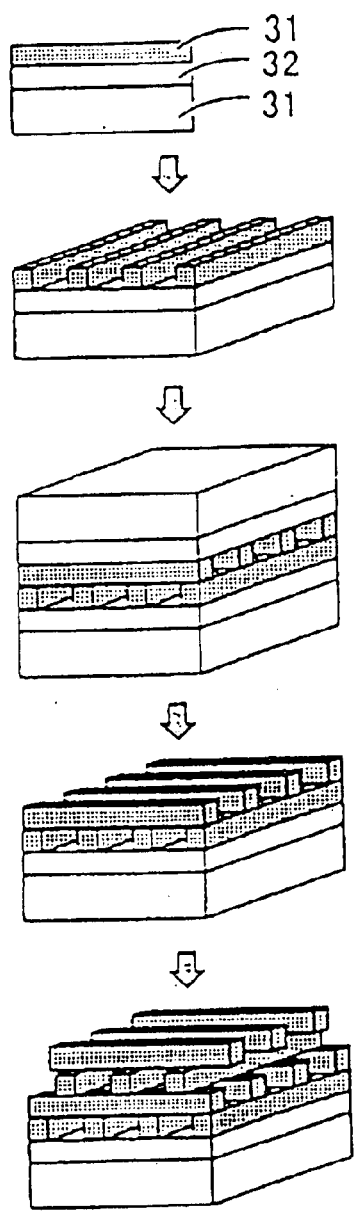
FIG. 55 is an explanatory view showing a method of fabricating a three-dimensional periodic structure that does not use the present invention.

Further, FIG. 53 shows a method of integrating a three-dimensional PBS and a laser and a structure in question. On a compound semiconductor substrate (for example, InP or GaAs), is formed a two-dimensional recessed or projecting pattern. On that substrate, is formed three-dimensional PBS such as $SiO_2$/a-Si by the method of Embodiments 1, 2, and, then, a hole reaching the substrate is formed by dry etching. On its surface, a semiconductor laser is produced by epitaxial growth. In this structure, unnecessary radiation in the transverse direction is prohibited or suppressed, and accordingly, laser operation threshold is favorably decreased. In FIGS. 52 and 63, an electrode and lead may be provided separately, or, Si within PBS may be doped to have electrical conduction property and thus to serve as an electrode and lead.

[embodiment 11]

Further, PBS can be applied to a programmable laser, as follows. As described in other parts (Embodiment 2 and FIG. 23), in the case of a complex element in which an electrically excitable pn-junction or optically excitable dye is provided inside a PBS structure that permits only a specific mode, only emission process concerned with the permitted mode is allowed, and other spontaneously emitted light is radiated only along specific directions. In such PBS, when a material having electrooptic effect is used as its component, its filter property can be controlled with external voltage, and thus, a spectrum or emitting direction of a light emitting element can be electrically programmed.

[Embodiment 12]

By building in a photodetector such as a photodiode into a three-dimensional periodic structure having PBS characteristic, being coupled with the outside through a waveguide, radiation into the photodetector from the outside, i.e., noise input, can be suppressed, contributing to reduction of input noise and improvement of receiving sensitivity. Further, based on disappearance or reduction of radiation solid angles, the degree of freedom of the zero point fluctuation disappears or decreases, reducing noise furthermore.

Further, a programmable photodetector can be realized as follows. When a p-n junction or photoconductive photodetector having sensitivity to a specific wavelength region is built in into the inside of a complete PBS structure, there is realized a state that signal light and background light from the outside do not arrive at the photosensitive part. When PBS that is slightly deviated from this state is used, only light of specific wavelength arrives at the photo detection part from a specific direction. Accordingly, this complex element can be used in an complex element having strong selectivity for wavelength and direction (wave number) of incident light. By using, for example, a material having electrooptic effect as a component of PBS, PBS can be varied in its filter property by applying external voltage. Thus, it is possible to electrically program a response characteristic of the photodetector.

[Embodiment 13]

By periodically laminating two or more kinds of transparent materials having common periodic recessed or projecting portions on a substrate having two-dimensionally periodic recessed or projecting portions with orthogonal x- and y-axes being as axes of symmetry as shown in FIG. 18, that three-dimensional structure functions as a biaxial anisotropic artificial medium having an effective optical dielectric tensor:

$$\bar{\varepsilon} = \begin{bmatrix} \varepsilon_{xx} & 0 & 0 \\ 0 & \varepsilon_{yy} & 0 \\ 0 & 0 & \varepsilon_{zz} \end{bmatrix}$$

in a general wavelength region except for a cutoff frequency region. According to suitable design, a medium constant within some range can be continuously realized, differently from natural material. Further, it has a property that very large anisotropy can be realized owing to strong dispersion appearing in the neighborhood of the cutoff region.

INDUSTRIAL APPLICABILITY

As described above, according to the method of claim 2, 4, or 6, it is possible to industrially produce an extremely fine three-dimensional periodic structure by effectively utilizing shaping effects of the technique that employs sputter etching by itself or at the same time with film formation. Thus, it is possible to realize photonic bandgap effect.

According to the above, by developing the above-mentioned technique furthermore, it is possible to periodically provide material with nonlinear optical susceptibility, electrooptic material, transparent material, conductive material, or the like, inside the three-dimensional periodic structure. Thus, a great variety of electronic functions and optical functions can be realized.

According to the above, it is possible to periodically provide light emitting or light amplifying material inside a three-dimensional periodic structure, and a high efficient optical active element can be realized.

According to the above, it is possible to integrate functional parts such as a waveguide, resonator, branch, coupler, reflector, optical detector, or the like, inside a three-dimensional periodic structure in which at least two kinds of film transparent material having periodic recessed and projecting pattern is nearly periodically laminated sequentially, i.e., inside an artificial medium having cutoff characteristic for a certain light wavelength region. Thus, it is possible to effectively utilize the advantage of the non-radiative characteristic. It is possible to provide a semiconductor laser inside a three-dimensional periodic structure, and thus high efficient laser action without loss of spontaneously emitted light can be realized.

It is possible to realize a structure in which, on a substrate having two-dimensionally periodic recessed and projecting patterns with the aces of symmetry of orthogonal x- and y-axes on the substrate, at least two kinds of film transparent materials having common periodic recessed and projecting patterns are laminated sequentially and periodically, Accordingly, it is possible to realize optical biaxial anisotropy expressed by a diagonal dielectric tensor of any values.

What is claimed is:

1. A method of fabricating a three-dimensional periodic structure comprising the steps of:

forming layers with at least two kinds of materials sequentially and periodically on a substrate having two-dimensionally periodically recessed or projecting portions; and employing sputter etching either separately from film deposition or simultaneously with film deposition, at least in a part of said structure, while keeping a pattern of the receded or projecting portions.

2. The method of claim 1, wherein said deposition is further characterized by incidence of particles.

3. The method of claim 1, wherein a period of said structure further comprises at least two kinds of layers including a layer mainly comprising $SiO_2$ and a layer mainly comprising Si.

4. A structure fabricated by the method of claim 1, comprising at least two kinds of material, at least one said material being a transparent material whose period in at least one dimension is of the order of or a fraction of a wavelength of concerned light, at least two said kinds of materials being in a form of layers, said structure including an x-y direction, at least one said layer being continuous relative to said x-y direction.

5. The structure of claim 4, wherein a part of said structure comprises at least one of a material having a nonlinear optical susceptibility, an electrooptic material, a light emitting material, a light amplifying material, and a conductive material.

6. The structure of claim 4, wherein said layers each have characteristic diffraction effects of light.

7. The structure of claim 4, wherein said structure further shows optical biaxial anisotropy.

8. The structure of claim 4, wherein said structure further shows dispersion characteristics near the edge of a forbidden frequency band.

9. The structure of claim 4, wherein each said layer is continuous relative to said x-y direction.

* * * * *